(12) United States Patent
Sakamoto et al.

(10) Patent No.: US 10,597,583 B2
(45) Date of Patent: Mar. 24, 2020

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Atsushi Sakamoto, Chiba (JP); Masayuki Saito, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 67 days.

(21) Appl. No.: 15/900,807

(22) Filed: Feb. 21, 2018

(65) Prior Publication Data

US 2018/0244996 A1 Aug. 30, 2018

(30) Foreign Application Priority Data

Feb. 27, 2017 (JP) ................................ 2017-034601
Apr. 21, 2017 (JP) ................................ 2017-084159

(51) Int. Cl.

| | | |
|---|---|---|
| *G02F 1/1333* | (2006.01) | |
| *C09K 19/34* | (2006.01) | |
| *C09K 19/30* | (2006.01) | |
| *C09K 19/54* | (2006.01) | |
| *G02F 1/137* | (2006.01) | |
| *C09K 19/20* | (2006.01) | |
| *C09K 19/14* | (2006.01) | |
| *G02F 1/1362* | (2006.01) | |
| *C09K 19/12* | (2006.01) | |
| *C09K 19/04* | (2006.01) | |

(52) U.S. Cl.
CPC .......... *C09K 19/3402* (2013.01); *C09K 19/14* (2013.01); *C09K 19/20* (2013.01); *C09K 19/3028* (2013.01); *C09K 19/3066* (2013.01); *C09K 19/3068* (2013.01); *C09K 19/542* (2013.01); *G02F 1/137* (2013.01); *C09K 2019/0411* (2013.01); *C09K 2019/0448* (2013.01); *C09K 2019/122* (2013.01); *C09K 2019/123* (2013.01); *C09K 2019/3004* (2013.01); *C09K 2019/3016* (2013.01); *C09K 2019/3037* (2013.01); *C09K 2019/3071* (2013.01); *C09K 2019/3422* (2013.01); *C09K 2019/3425* (2013.01); *C09K 2019/548* (2013.01); *G02F 1/1362* (2013.01); *G02F 2001/13712* (2013.01)

(58) Field of Classification Search
CPC .... C09K 19/3402; C09K 19/14; C09K 19/20; C09K 19/3028; C09K 19/3066; C09K 19/3068; C09K 19/542; C09K 2019/0411; C09K 2019/0448; C09K 2019/122; C09K 2019/123; C09K 2019/3004; C09K 2019/3016; C09K 2019/3037; C09K 2019/3071; C09K 2019/3422; C09K 2019/3425; C09K 2019/548; G02F 1/1333; G02F 1/137; G02F 1/1362; G02F 2001/13712
USPC .................................................... 252/299.61
See application file for complete search history.

(56) References Cited

U.S. PATENT DOCUMENTS

| | | | |
|---|---|---|---|
| 2011/0037024 A1 | 2/2011 | Kobayashi | |
| 2018/0244996 A1* | 8/2018 | Sakamoto | .......... C09K 19/3402 |

FOREIGN PATENT DOCUMENTS

| | | |
|---|---|---|
| WO | 2009125668 | 10/2009 |

* cited by examiner

*Primary Examiner* — Geraldina Visconti
(74) *Attorney, Agent, or Firm* — JCIPRNET

(57) ABSTRACT

Shown are a liquid crystal composition satisfying at least one of characteristics such as high maximum temperature, low minimum temperature, low viscosity, suitable optical anisotropy and large negative dielectric anisotropy, or having a suitable balance regarding at least two of the characteristics, and an AM device including the composition. The liquid crystal composition contains a specific compound having large negative dielectric anisotropy as a first component, and a specific compound having low viscosity as a second component, and may contain a specific compound having negative dielectric anisotropy as a third component, a specific compound having high maximum temperature or low viscosity as a fourth component, or a specific compound having a polymerizable group as an additive.

20 Claims, No Drawings

LIQUID CRYSTAL COMPOSITION AND LIQUID CRYSTAL DISPLAY DEVICE

CROSS-REFERENCE TO RELATED APPLICATION

This application claims the priority benefits of Japan application serial no. 2017-034601, filed on Feb. 27, 2017, and Japan application serial no. 2017-084159, filed on Apr. 21, 2017. The entirety of the above-mentioned patent applications is hereby incorporated by reference herein and made apart of this specification.

TECHNICAL FIELD

The invention relates to a liquid crystal composition, a liquid crystal display device including the composition, and so forth. In particular, the invention relates to a liquid crystal composition having negative dielectric anisotropy, and a liquid crystal display device that includes the composition and has a mode such as an IPS mode, a VA mode, an FFS mode and an FPA mode. The invention also relates to a polymer sustained alignment mode liquid crystal display device.

BACKGROUND ART

In a liquid crystal display device, a classification based on an operating mode for liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a field-induced photo-reactive alignment (FPA) mode. A classification based on a driving mode in the device includes a passive matrix (PM) and an active matrix (AM). The PM is classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type based on a production process. A classification based on a light source includes a reflective type utilizing natural light, a transmissive type utilizing backlight and a transflective type utilizing both the natural light and the backlight.

The liquid crystal display device includes a liquid crystal composition having a nematic phase. The composition has suitable characteristics. An AM device having good characteristics can be obtained by improving characteristics of the composition. Table 1 below summarizes a relationship in the characteristics. The characteristics of the composition will be further described based on a commercially available AM device. A temperature range of the nematic phase relates to a temperature range in which the device can be used. A preferred maximum temperature of the nematic phase is about 70° C. or higher, and a preferred minimum temperature of the nematic phase is about −10° C. or lower. Viscosity of the composition relates to a response time in the device. A short response time is preferred for displaying moving images on the device. A shorter response time even by one millisecond is desirable. Accordingly, a low viscosity in the composition is preferred. A low viscosity at low temperature is further preferred.

TABLE 1

Characteristics of composition and characteristics of AM device

| No. | Characteristics of composition | Characteristics of AM device |
|---|---|---|
| 1 | Wide temperature range of a nematic phase | Wide usable temperature range |
| 2 | Low viscosity | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |

Optical anisotropy of the composition relates to a contrast ratio in the device. According to a mode of the device, large optical anisotropy or small optical anisotropy, more specifically, suitable optical anisotropy is required. A product (Δn×d) of the optical anisotropy (Δn) of the composition and a cell gap (d) in the device is designed so as to maximize the contrast ratio. A suitable value of the product depends on a type of the operating mode. In a device having the VA mode, the value is in the range from about 0.30 micrometer to about 0.40 micrometer, and in a device having the IPS mode or the FFS mode, the value is in the range from about 0.20 micrometer to about 0.30 micrometer. In the above case, a composition having large optical anisotropy is preferred for a device having a small cell gap. Large dielectric anisotropy in the composition contributes to low threshold voltage, small electric power consumption and a large contrast ratio in the device. Accordingly, the large dielectric anisotropy is preferred. Large specific resistance in the composition contributes to a large voltage holding ratio and the large contrast ratio in the device. Accordingly, a composition having large specific resistance in an initial stage is preferred. The composition having the large specific resistance even after the device has been used for a long period of time is preferred. Stability of the composition to ultraviolet light or heat relates to a service life of the device. In the case where the stability is high, the device has a long service life. Such characteristics are preferred for an AM device use in a liquid crystal monitor, a liquid crystal television and so forth.

In a general-purpose liquid crystal display device, vertical alignment of liquid crystal molecules is achieved by a specific polyimide alignment film. In a polymer sustained alignment (PSA) mode liquid crystal display device, a polymer is combined with an alignment film. First, a composition to which a small amount of a polymerizable compound is added is injected into the device. Next, the composition is irradiated with ultraviolet light while voltage is applied between substrates of the device. The polymerizable compound is polymerized to form a network structure of the polymer in the composition. In the composition, alignment of liquid crystal molecules can be controlled by the polymer, and therefore the response time in the device is shortened and also image persistence is improved. Such an effect of the polymer can be expected for a device having the mode such as the TN mode, the ECB mode, the OCB mode, the IPS mode, the VA mode, the FFS mode and the FPA mode.

A composition having positive dielectric anisotropy is used in an AM device having the TN mode. A composition having negative dielectric anisotropy is used in an AM device having the VA mode. In an AM device having the IPS mode or the FFS mode, a composition having positive or negative dielectric anisotropy is used. In a polymer sustained alignment mode AM device, a composition having positive or negative dielectric anisotropy is used. A compound contained in a first component of the invention is disclosed in Patent literature No. 1 described below.

CITATION LIST

Patent Literature

Patent literature No. 1: WO 2009/125668 A1.

SUMMARY OF INVENTION

Technical Problem

The invention provides a liquid crystal composition satisfying at least one of characteristics such as high maximum temperature of a nematic phase, low minimum temperature of the nematic phase, low viscosity, suitable optical anisotropy, large negative dielectric anisotropy, large specific resistance, high stability to ultraviolet light and high stability to heat. The invention further provides a liquid crystal composition having a suitable balance regarding at least two of the characteristics. The invention also provides a liquid crystal display device including such a composition. The invention still further provides an AM device having characteristics such as a short response time, a large voltage holding ratio, low threshold voltage, a large contrast ratio and a long service life.

Solution to Problem

The invention concerns a liquid crystal composition that has negative dielectric anisotropy, and contains at least one compound selected from compounds represented by formula (1) as a first component and at least one compound selected from compounds represented by formula (2) as a second component, and a liquid crystal display device including the composition:

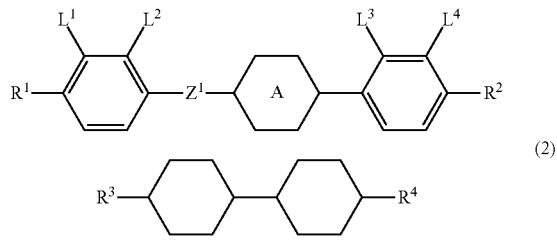

wherein, in formula (1) and formula (2), $R^1$ and $R^2$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine; $R^3$ is alkyl having 1 to 12 carbons, alkenyl having 2 to 12 carbons, or alkenyl having 2 to 12 carbons in which at least one hydrogen is replaced by fluorine or chlorine; $R^4$ is alkenyl having 2 to 12 carbons, or alkenyl having 2 to 12 carbons in which at least one hydrogen is replaced by fluorine or chlorine; ring A is 1,4-cyclohexylene, 1,4-phenylene, 2-fluoro-1,4-phenylene, 2,3-difluoro-1,4-phenylene, tetrahydropyran-2,5-diyl, pyrimidine-2,5-diyl or pyridine-2,5-diyl; $L^1$, $L^2$, $L^3$ and $L^4$ are independently hydrogen or fluorine, in which at least three thereof is fluorine; and $Z^1$ is a single bond, ethylene, carbonyloxy or methyleneoxy.

Advantageous Effects of Invention

One of advantages of the invention is to provide a liquid crystal composition satisfying at least one of characteristics such as high maximum temperature of a nematic phase, low minimum temperature of the nematic phase, low viscosity, suitable optical anisotropy, large negative dielectric anisotropy, large specific resistance, high stability to ultraviolet light and high stability to heat. Another advantage is to provide a liquid crystal composition having a suitable balance regarding at least two of the characteristics. Another advantage is to provide a liquid crystal display device including such a composition. Another advantage is to provide an AM device having characteristics such as a short response time, a large voltage holding ratio, low threshold voltage, a large contrast ratio and a long service life.

DESCRIPTION OF EMBODIMENTS

Usage of terms herein is as described below. Terms "liquid crystal composition" and "liquid crystal display device" may be occasionally abbreviated as "composition" and "device," respectively. "Liquid crystal display device" is a generic term for a liquid crystal display panel and a liquid crystal display module. "Liquid crystal compound" is a generic term for a compound having a liquid crystal phase such as a nematic phase and a smectic phase, and a compound having no liquid crystal phase but to be mixed with the composition for the purpose of adjusting characteristics such as a temperature range of the nematic phase, viscosity and dielectric anisotropy. The compound has a six-membered ring such as 1,4-cyclohexylene or 1,4-phenylene, and has rod-like molecular structure. "Polymerizable compound" is a compound to be added for the purpose of forming a polymer in the composition. A liquid crystal compound having alkenyl is not polymerizable in the above meaning.

The liquid crystal composition is prepared by mixing a plurality of liquid crystal compounds. An additive such as an optically active compound, an antioxidant, an ultraviolet light absorber, a dye, an antifoaming agent, the polymerizable compound, a polymerization initiator, a polymerization inhibitor and a polar compound is added to the liquid crystal composition when necessary. A proportion of the liquid crystal compound is expressed in terms of weight percent (% by weight) based on the weight of the liquid crystal composition containing no additive even after the additive has been added. A proportion of the additive is expressed in terms of weight percent (% by weight) based on the weight of the liquid crystal composition containing no additive. More specifically, a proportion of the liquid crystal compound or the additive is calculated based on the total weight of the liquid crystal compound. Weight parts per million (ppm) may be occasionally used. A proportion of the polymerization initiator and the polymerization inhibitor is exceptionally expressed based on the weight of the polymerizable compound.

"Maximum temperature of the nematic phase" may be occasionally abbreviated as "maximum temperature." "Minimum temperature of the nematic phase" may be occasionally abbreviated as "minimum temperature." An expression "having large specific resistance" means that the composition has large specific resistance in an initial stage, and the composition has the large specific resistance even after the device has been used for a long period of time. An expression "having a large voltage holding ratio" means that the device has a large voltage holding ratio at room temperature and also at a temperature close to the maximum temperature in an initial stage, and the device has the large voltage holding ratio at room temperature and also at a temperature close to the maximum temperature even after the device has been used for a long period of time. Characteristics of the composition or the device may be occasionally examined by an aging test. An expression "increase the dielectric anisotropy" means that a value of dielectric anisotropy positively increases in a composition having positive dielectric anisotropy, and the value of dielectric anisotropy negatively increases in a composition having negative dielectric anisotropy.

A compound represented by formula (1) may be occasionally abbreviated as "compound (1)." At least one compound selected from the group of compounds represented by formula (1) may be occasionally abbreviated as "compound (1)." "Compound (1)" means one compound, a mixture of two compounds or a mixture of three or more compounds represented by formula (1). A same rule applies also to any other compound represented by any other formula. An expression "at least one piece of 'A'" means that the number of 'A' is arbitrary. An expression "at least one piece of 'A' may be replaced by 'B'" means that, when the number of 'A' is 1, a position of 'A' is arbitrary, and also when the number of 'A' is 2 or more, positions thereof can be selected without restriction. A same rule applies also to an expression "at least one piece of 'A' is replaced by 'B'."

An expression such as "at least one piece of —$CH_2$— may be replaced by —O—" is used herein. In the above case, —$CH_2$—$CH_2$—$CH_2$— may be converted into —O—$CH_2$—O— by replacement of non-adjacent —$CH_2$— by —O—. However, a case where —$CH_2$— adjacent to each other is replaced by —O— is excluded. The reason is that —O—O—$CH_2$— (peroxide) is formed in the above replacement. More specifically, the expression means both "one piece of —$CH_2$— may be replaced by —O—" and "at least two pieces of non-adjacent —$CH_2$— may be replaced by —O—." A same rule applies not only to replacement to —O— but also to replacement to a divalent group such as —CH=CH— or —COO—.

A symbol of terminal group $R^1$ is used in a plurality of compounds in chemical formulas of component compounds. In the compounds, two groups represented by two pieces of arbitrary $R^1$ may be identical or different. For example, in one case, $R^1$ of compound (1-1) is ethyl and $R^1$ of compound (1-2) is ethyl. In another case, $R^1$ of compound (1-1) is ethyl and $R^1$ of compound (1-2) is propyl. A same rule applies also to a symbol of any other terminal group or the like. In formula (3), when a subscript 'a' is 2, two of ring B exists. In the compound, two rings represented by two of ring B may be identical or different. A same rule applies also to two of arbitrary ring B when the subscript 'a' is larger than 2. A same rule applies also to a symbol of $Z^4$, ring I or the like. A same rule applies also to such a case where two pieces of -$Sp^2$-$P^2$ exists in compound (5-27).

Symbol A, B, C, D or the like surrounded by a hexagonal shape corresponds to ring A, ring B, ring C and ring D, respectively, and represents a six-membered ring, a fused ring or the like. In compound (5), an oblique line crossing one side of the hexagonal shape represents that arbitrary hydrogen on the ring may be replaced by -$Sp^1$-$P^1$ group or the like. A subscript such as 'e' represents the number of groups to be replaced. When the subscript 'e' is 0 (zero), no such replacement exists. When the subscript 'e' is 2 or more, a plurality of pieces of -$Sp^1$-$P^1$- exist on ring G. The plurality of groups represented by -$Sp^1$-$P^1$ may be identical or different. In an expression "ring A and ring B are independently X, Y or Z," the subject is plural, and therefore "independently" is used. When the subject is "ring A," the subject is singular, and therefore "independently" is not used.

Then, 2-fluoro-1,4-phenylene means two divalent groups described below. In a chemical formula, fluorine may be leftward (L) or rightward (R). A same rule applies also to a left-right asymmetrical divalent group formed by removing two hydrogens from tetrahydropyran-2,5-diyl or a ring. A same rule applies also to a divalent bonding group such as carbonyloxy (—COO— or —OCO—).

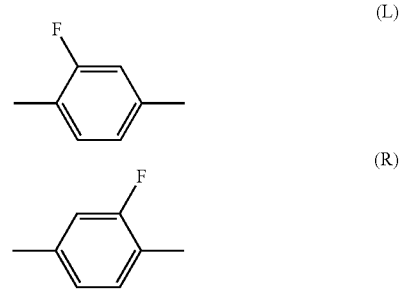

Alkyl of the liquid crystal compound is straight-chain alkyl or branched-chain alkyl, and includes no cyclic alkyl. Straight-chain alkyl is preferred to branched-chain alkyl. A same rule applies also to a terminal group such as alkoxy and alkenyl. With regard to a configuration of 1,4-cyclohexylene, trans is preferred to cis for increasing the maximum temperature.

The invention includes items described below.

Item 1. A liquid crystal composition that has negative dielectric anisotropy, and contains at least one compound selected from compounds represented by formula (1) as a first component and at least one compound selected from compounds represented by formula (2) as a second component:

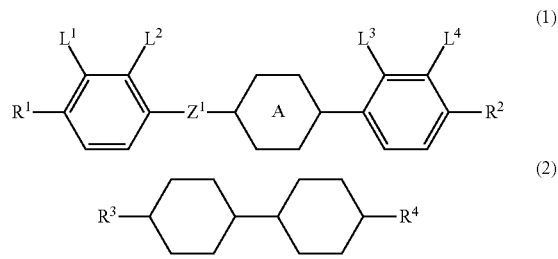

wherein, in formula (1) and formula (2), $R^1$ and $R^2$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine; $R^3$ is alkyl having 1 to 12 carbons, alkenyl having 2 to 12 carbons, or alkenyl having 2 to 12 carbons in which at least one hydrogen is replaced by fluorine or chlorine; $R^4$ is alkenyl having 2 to 12 carbons, or alkenyl having 2 to 12 carbons in which at least one hydrogen is replaced by fluorine or chlorine; ring A is 1,4-cyclohexylene, 1,4-phenylene, 2-fluoro-1,4-phenylene, 2,3-difluoro-1,4-phenylene, tetrahydropyran-2,5-diyl, pyrimidine-2,5-diyl or pyridine-2,5-diyl; $L^1$, $L^2$, $L^3$ and $L^4$ are independently hydrogen or fluorine, in which at least three thereof is fluorine; and $Z^1$ is a single bond, ethylene, carbonyloxy or methyleneoxy.

Item 2. The liquid crystal composition according to item 1, containing at least one compound selected from the group of compounds represented by formula (1-1) to formula (1-8) as the first component:

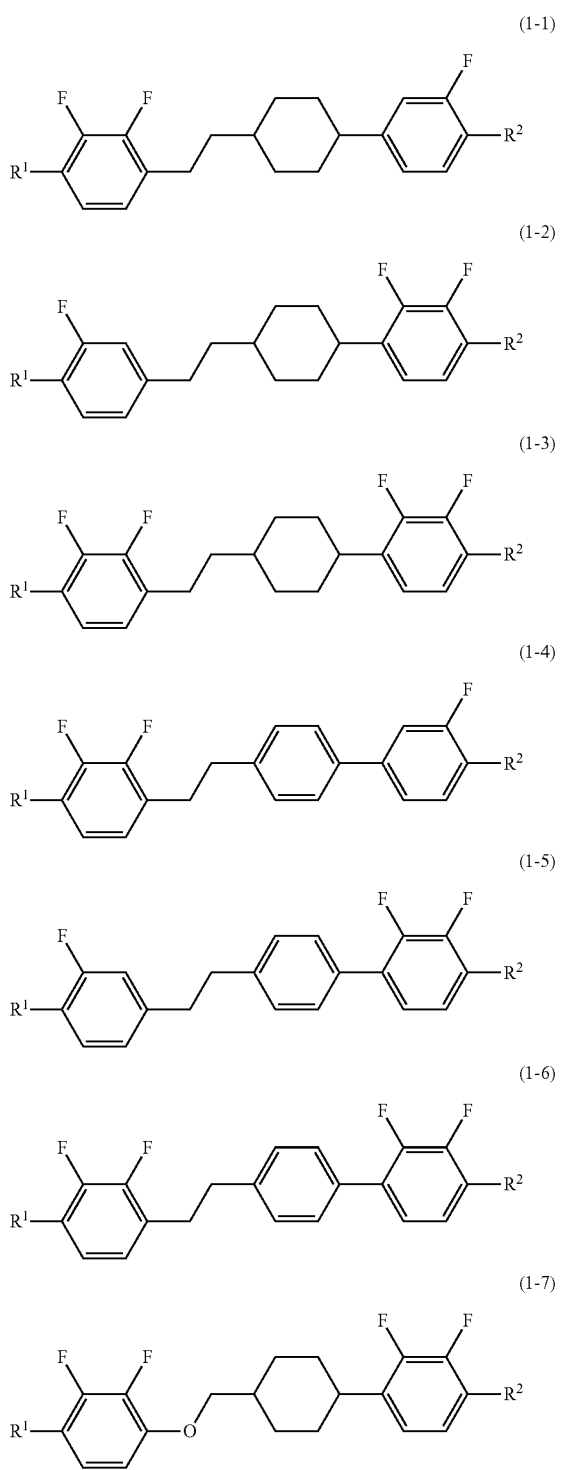

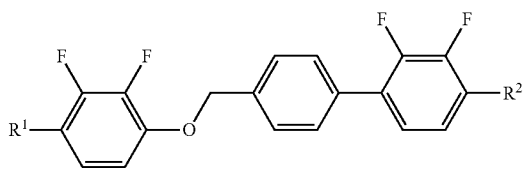

wherein, in formula (1-1) to formula (1-8), $R^1$ and $R^2$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine.

Item 3. The liquid crystal composition according to item 1 or 2, containing at least one compound selected from the group of compounds represented by formula (2-1) to formula (2-18) as the second component:

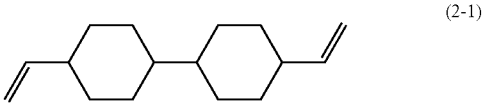
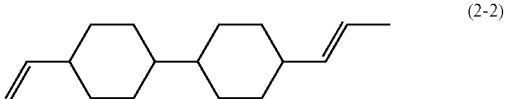
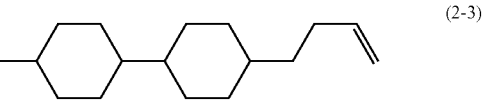
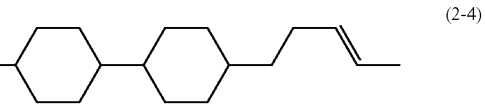
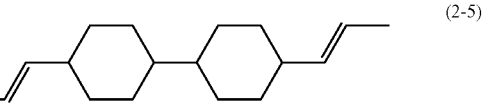
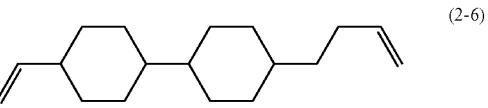
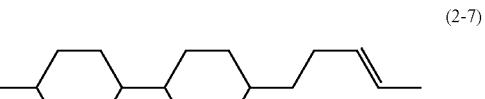
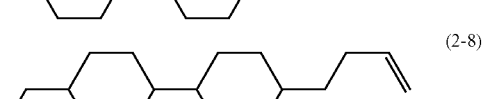
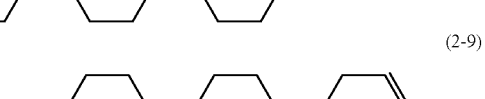
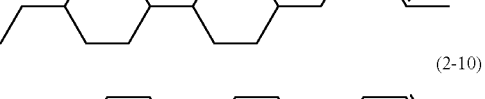

-continued

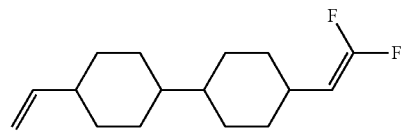
(2-11)

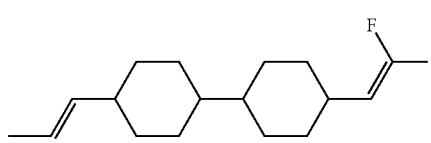
(2-12)

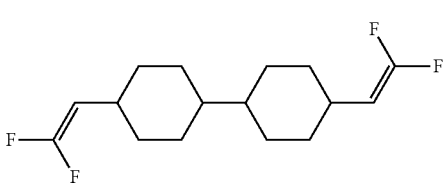
(2-13)

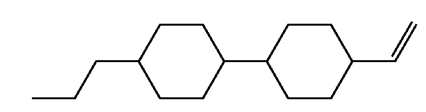
(2-14)

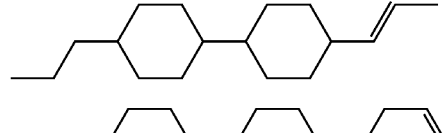
(2-15)

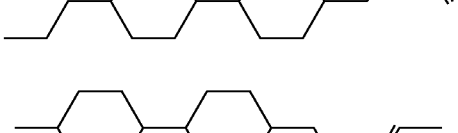
(2-16)

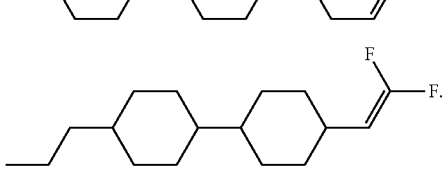
(2-17)

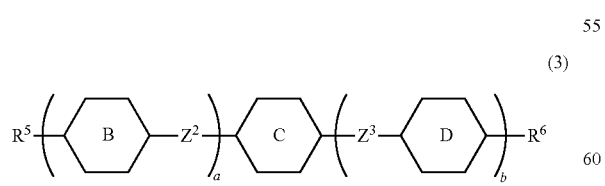
(2-18)

Item 4. The liquid crystal composition according to any one of items 1 to 3, wherein a proportion of the first component is in the range from 3% by weight to 25% by weight, and a proportion of the second component is in the range from 15% by weight to 70% by weight, based on the weight of the liquid crystal composition.

Item 5. The liquid crystal composition according to any one of items 1 to 4, containing at least one compound selected from compounds represented by formula (3) as a third component:

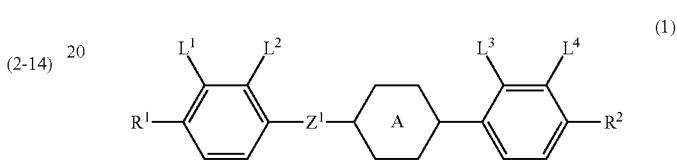
(3)

wherein, in formula (3), $R^5$ and $R^6$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine; ring B and ring D are independently 1,4-cyclohexylene, 1,4-cyclohexenylene, 1,4-phenylene, tetrahydropyran-2,5-diyl, 1,4-phenylene in which at least one hydrogen is replaced by fluorine or chlorine, naphthalene-2,6-diyl, naphthalene-2,6-diyl in which at least one hydrogen is replaced by fluorine or chlorine, chroman-2,6-diyl, or chroman-2,6-diyl in which at least one hydrogen is replaced by fluorine or chlorine; ring C is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^2$ and $Z^3$ are independently a single bond, ethylene, carbonyloxy or methyleneoxy; and a is 1, 2 or 3, b is 0 or 1, and a sum of a and b is 3 or less; however compounds represented by formula (1) are excluded from compounds represented by formula (3):

(1)

$$R^1 \text{—} \overset{L^1}{\underset{}{\text{—}}} \overset{L^2}{\underset{}{\text{—}}} \text{—} Z^1 \text{—} A \text{—} \overset{L^3}{\underset{}{\text{—}}} \overset{L^4}{\underset{}{\text{—}}} \text{—} R^2$$

wherein, in formula (1), $R^1$ and $R^2$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine; ring A is 1,4-cyclohexylene, 1,4-phenylene, 2-fluoro-1,4-phenylene, 2,3-difluoro-1,4-phenylene, tetrahydropyran-2,5-diyl, pyrimidine-2,5-diyl or pyridine-2,5-diyl; $L^1$, $L^2$, $L^3$ and $L^4$ are independently hydrogen or fluorine, in which at least three thereof is fluorine; and $Z^1$ is a single bond, ethylene, carbonyloxy or methyleneoxy.

Item 6. The liquid crystal composition according to anyone of items 1 to 5, containing at least one compound selected from the group of compounds represented by formula (3-1) to formula (3-22) as the third component:

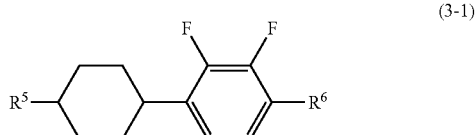
(3-1)

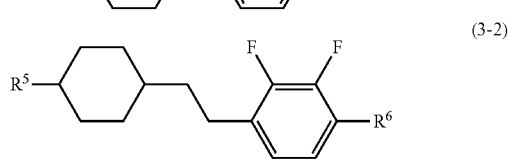
(3-2)

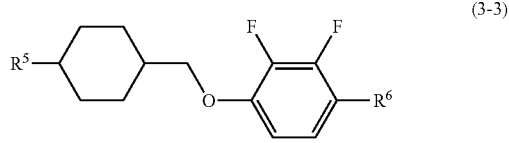
(3-3)

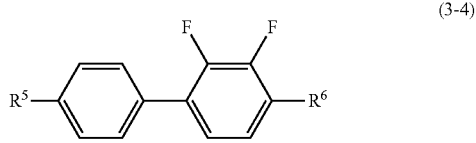
(3-4)

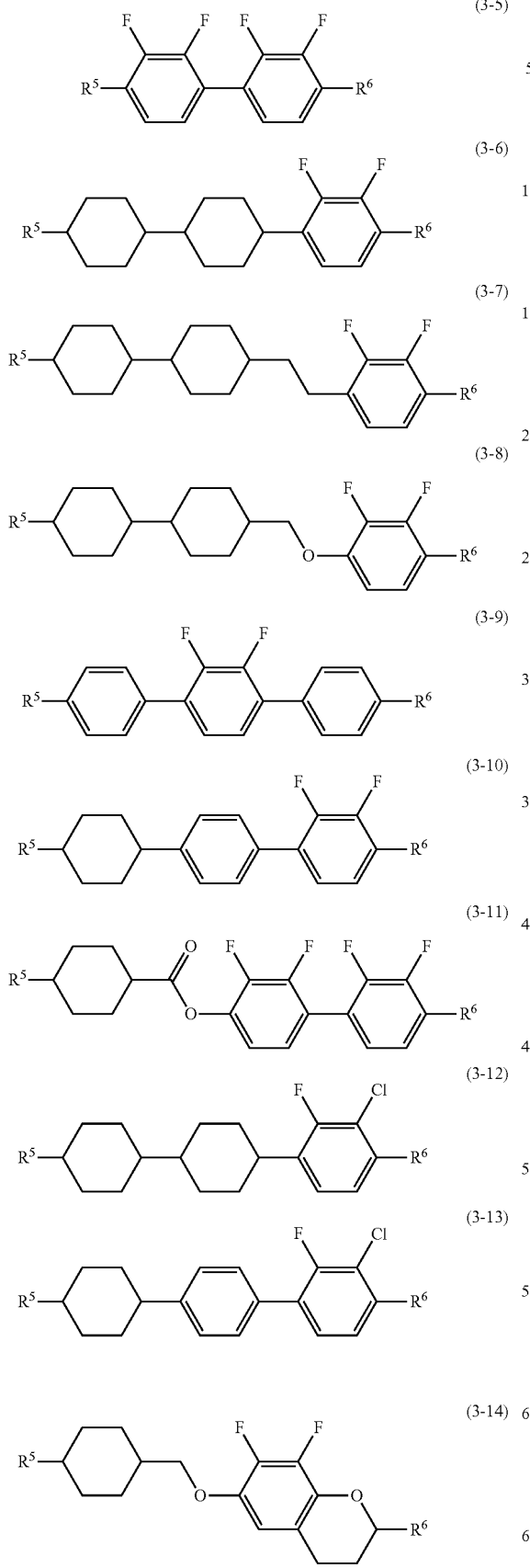
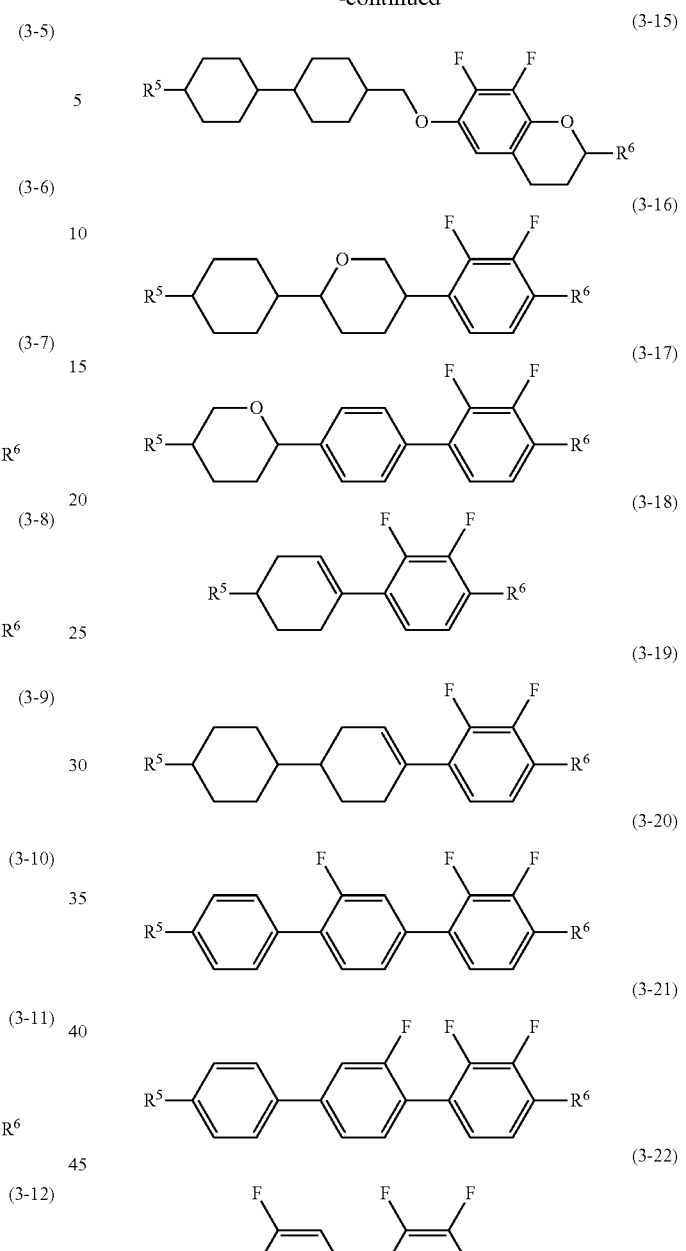

wherein, in formula (3-1) to formula (3-22), $R^5$ and $R^6$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine.

Item 7. The liquid crystal composition according to item 5 or 6, wherein a proportion of the third component is in the range from 20% by weight to 75% by weight based on the weight of the liquid crystal composition.

Item 8. The liquid crystal composition according to any one of items 1 to 7, containing at least one compound selected from compounds represented by formula (4) as a fourth component:

(4)

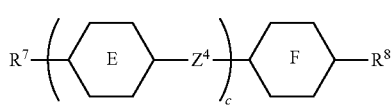

wherein, in formula (4), $R^7$ and $R^8$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; ring E and ring F are independently 1,4-cyclohexylene, 1,4-phenylene, 2-fluoro-1,4-phenylene or 2,5-difluoro-1,4-phenylene; $Z^4$ is a single bond, ethylene or carbonyloxy; c is 1, 2 or 3; and ring F is 1,4-phenylene when c is 1.

Item 9. The liquid crystal composition according to any one of items 1 to 8, containing at least one compound selected from the group of compounds represented by formula (4-1) to formula (4-12) as the fourth component:

(4-1)
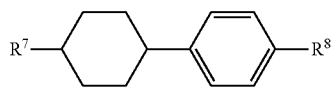

(4-2)
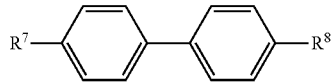

(4-3)
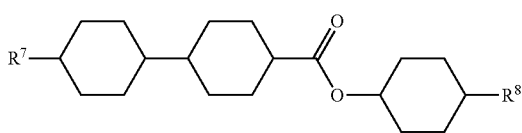

(4-4)

(4-5)

(4-6)
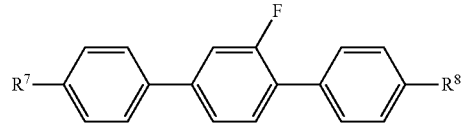

(4-7)
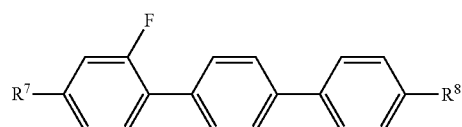

(4-8)
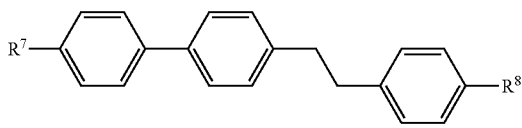

(4-9)
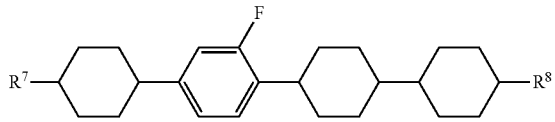

(4-10)
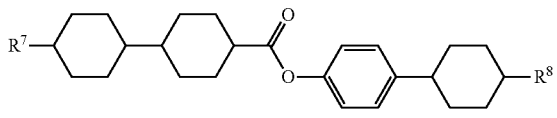

(4-11)
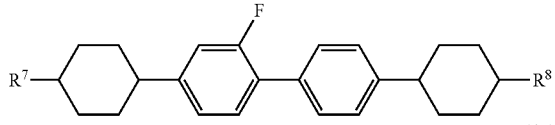

(4-12)
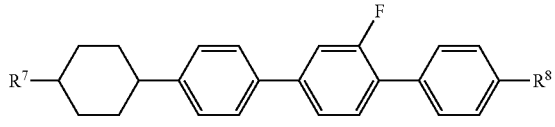

wherein, in formula (4-1) to formula (4-12), $R^7$ and $R^8$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine.

Item 10. The liquid crystal composition according to item 8 or 9, wherein a proportion of the fourth component is in the range from 2°, by weight to 30% by weight based on the weight of the liquid crystal composition.

Item 11. The liquid crystal composition according to any one of items 1 to 10, containing at least one compound selected from polymerizable compounds represented by formula (5) as an additive:

(5)

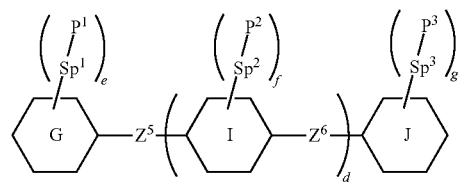

wherein, in formula (5), ring G and ring J are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; ring I is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^5$ and $Z^6$ are independently a single bond or alkylene having 1 to 10 carbons, and in the alkylene, at least one piece of —$CH_2$— may be replaced by —O—, —CO—, —COO— or —OCO—, and at least one piece of —$CH_2$—$CH_2$— may be replaced by —CH=CH—, —C($CH_3$)=CH—, —CH=C($CH_3$)— or —C($CH_3$)=C($CH_3$)—, and in these groups, at least one hydrogen may be replaced by fluorine or chlorine; $p^1$, $p^2$ and $p^3$ are independently a polymerizable group; $Sp^1$, $Sp^2$ and $Sp^3$ are independently a single bond or alkylene having 1 to 10 carbons, and in the alkylene, at least one piece of —$CH_2$— may be replaced by —O—, —COO—, —OCO— or —OCOO—, and at least one piece of —$CH_2$—$CH_2$— may be replaced by —CH=CH— or —C≡C—, and in these groups, at least one hydrogen may be replaced by fluorine or chlorine; d is 0, 1 or 2; and e, f and g are independently 0, 1, 2, 3 or 4, and a sum of e, f and g is 1 or more.

Item 12. The liquid crystal composition according to item 11, wherein, in formula (5), $p^1$, $p^2$ and $p^3$ are independently a group selected from the group of polymerizable groups represented by formula (P-1) to formula (P-5):

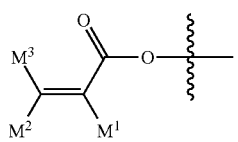
(P-1)

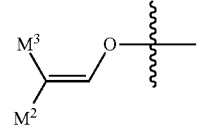
(P-2)

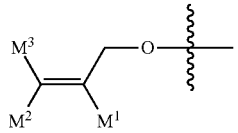
(P-3)

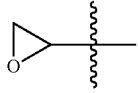
(P-4)

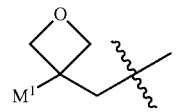
(P-5)

wherein, in formula (P-1) to formula (P-5), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine.

Item 13. The liquid crystal composition according to any one of items 1 to 12, containing at least one compound selected from the group of polymerizable compounds represented by formula (5-1) to formula (5-27) as the additive:

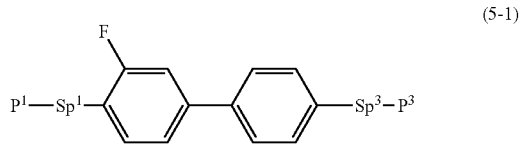
(5-1)

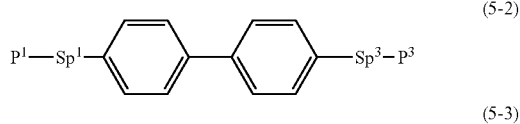
(5-2)

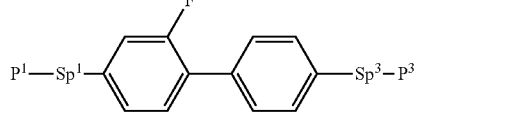
(5-3)

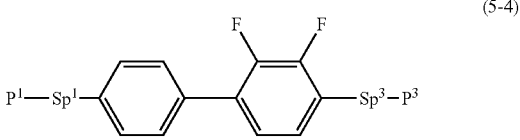
(5-4)

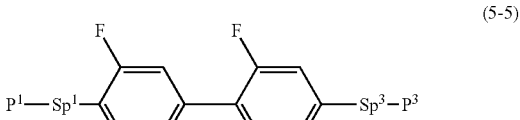
(5-5)

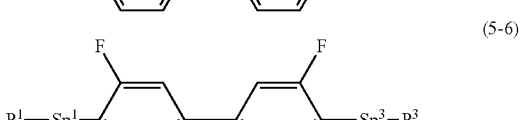
(5-6)

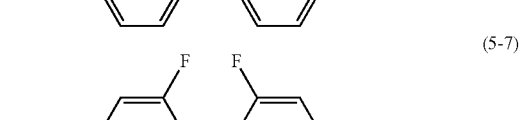
(5-7)

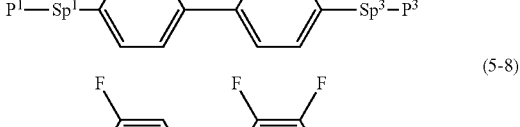
(5-8)

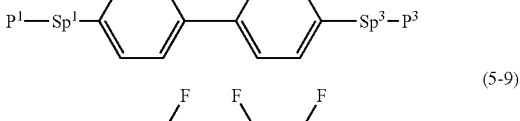
(5-9)

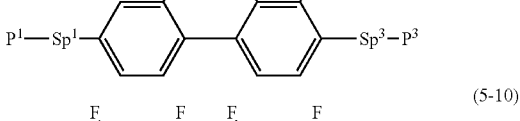
(5-10)

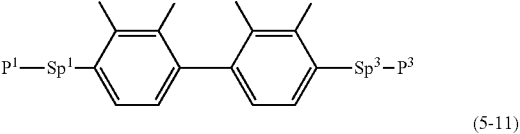
(5-11)

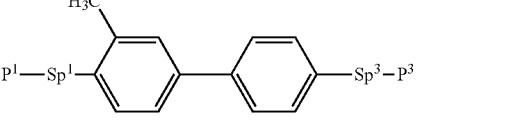
(5-12)

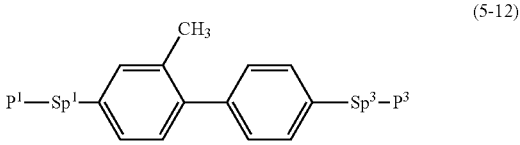

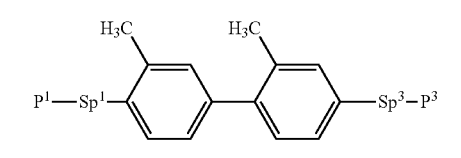
(5-13)
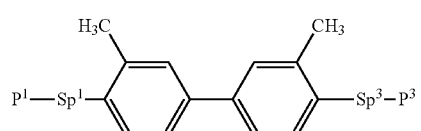
(5-14)
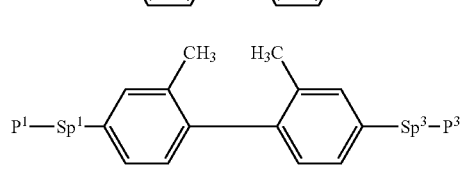
(5-15)
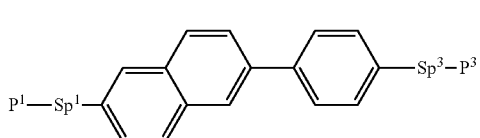
(5-16)
(5-17)
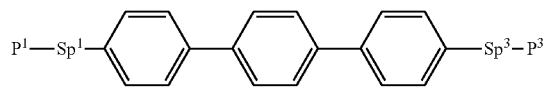
(5-18)
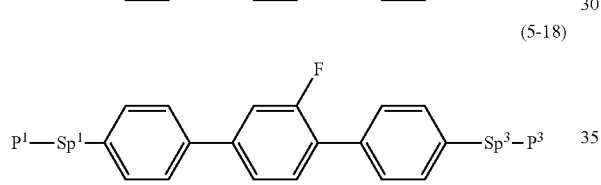
(5-19)
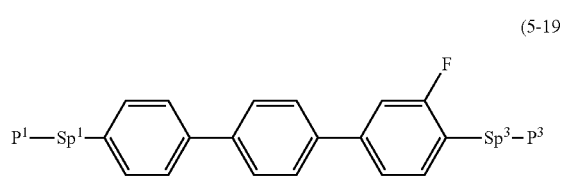
(5-20)
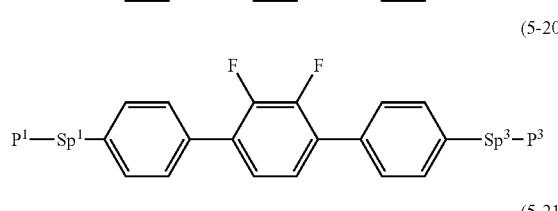
(5-21)
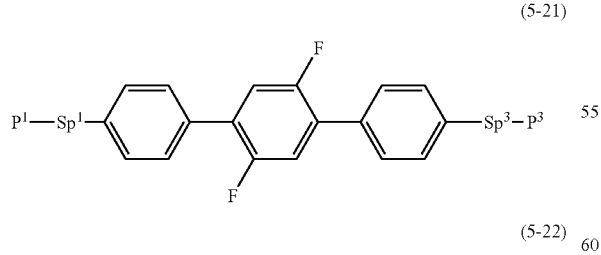
(5-22)
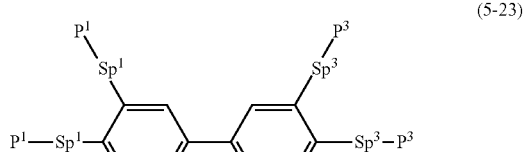
(5-23)
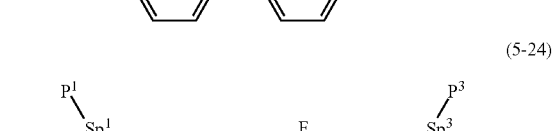
(5-24)
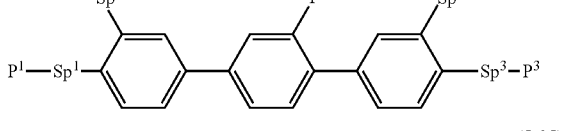
(5-25)
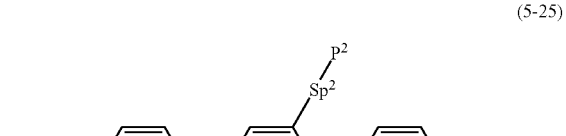
(5-26)
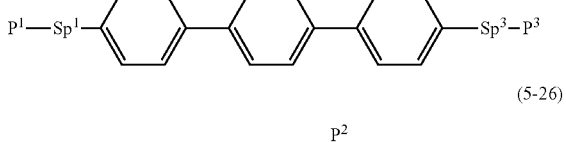
(5-27)
wherein, in formula (5-1) to formula (5-27), $p^1$, $p^2$ and $p^3$ are independently a group selected from the group of polymerizable groups represented by formula (P-1) to formula (P-3):
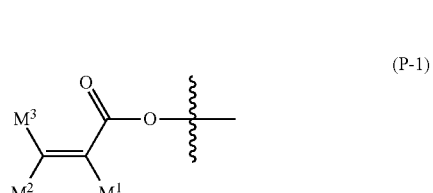
(P-1)
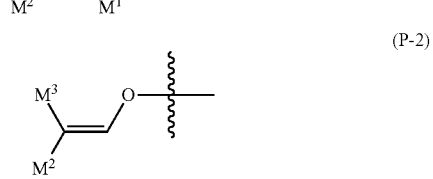
(P-2)

-continued

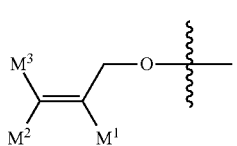
(P-3)

wherein $M^1$, $M^2$ and $M^3$ are independently hydrogen, fluorine, alkyl having 1 to 5 carbons, or alkyl having 1 to 5 carbons in which at least one hydrogen is replaced by fluorine or chlorine; and $Sp^1$, $Sp^2$ and $Sp^3$ are independently a single bond or alkylene having 1 to 10 carbons, and in the alkylene, at least one piece of —$CH_2$— may be replaced by —O—, —COO—, —OCO— or —OCOO—, and at least one piece of —$CH_2$—$CH_2$— may be replaced by —CH=CH— or —C≡C—, and in these groups, at least one hydrogen may be replaced by fluorine or chlorine.

Item 14. The liquid crystal composition according to any of items 11 to 13, wherein a proportion of the additive is in the range from 0.03% by weight to 10% by weight based on the weight of the liquid crystal composition.

Item 15. A liquid crystal display device, including the liquid crystal composition according to any one of items 1 to 14.

Item 16. The liquid crystal display device according to item 15, wherein an operating mode in the liquid crystal display device is an IPS mode, a VA mode, an FFS mode or an FPA mode, and a driving mode in the liquid crystal display device is an active matrix mode.

Item 17. A polymer sustained alignment mode liquid crystal display device, wherein the liquid crystal display device includes the liquid crystal composition according to any one of items 1 to 14, and an additive contained in the liquid crystal composition is polymerized.

Item 18. Use of the liquid crystal composition according to any one of items 1 to 14 in a liquid crystal display device.

Item 19. Use of the liquid crystal composition according to any one of items 1 to 14 in a polymer sustained alignment mode liquid crystal display device.

The invention further includes the following items: (a) the composition, further containing at least one of additives such as an optically active compound, an antioxidant, an ultraviolet light absorber, a dye, an antifoaming agent, a polymerizable compound, a polymerization initiator, a polymerization inhibitor and a polar compound; (b) an AM device including the composition; (c) a polymer sustained alignment (PSA) mode AM device including the composition further containing a polymerizable compound; (d) the polymer sustained alignment (PSA) mode AM device, wherein the device includes the composition, and the polymerizable compound in the composition is polymerized; (e) a device including the composition and having the PC mode, the TN mode, the STN mode, the ECB mode, the OCB mode, the IPS mode, the VA mode, the FFS mode or the FPA mode; (f) a transmissive device including the composition; (g) use of the composition as the composition having the nematic phase; and (h) use as an optically active composition by adding the optically active compound to the composition.

The composition of the invention will be described in the following order. First, a constitution of the composition will be described. Second, main characteristics of the component compounds and main effects of the compounds on the composition will be described. Third, a combination of components in the composition, a preferred proportion of the components and the basis thereof will be described. Fourth, a preferred embodiment of the component compounds will be described. Fifth, a preferred component compound will be described. Sixth, an additive that may be added to the composition will be described. Seventh, methods for synthesizing the component compounds will be described. Last, an application of the composition will be described.

First, the constitution of the composition will be described. The composition contains a plurality of liquid crystal compounds. The composition may contain an additive. The additive is the optically active compound, the antioxidant, the ultraviolet light absorber, the dye, the antifoaming agent, the polymerizable compound, the polymerization initiator, the polymerization inhibitor, the polar compound or the like. The composition is classified into composition A and composition B from a viewpoint of the liquid crystal compound. Composition A may further contain any other liquid crystal compound, an additive or the like in addition to the liquid crystal compound selected from compound (1), compound (2), compound (3) and compound (4). "Any other liquid crystal compound" means a liquid crystal compound different from compound (1), compound (2), compound (3) and compound (4). Such a compound is mixed with the composition for the purpose of further adjusting the characteristics.

Composition B consists essentially of liquid crystal compounds selected from compound (1), compound (2), compound (3) and compound (4). The term "essentially" means that the composition may contain the additive, but contains no any other liquid crystal compound. Composition B has a smaller number of components than composition A has. Composition B is preferred to composition A in view of cost reduction. Composition A is preferred to composition B in view of possibility of further adjusting the characteristics by mixing any other liquid crystal compound.

Second, the main characteristics of the component compounds and the main effects of the compounds on the composition will be described. The main characteristics of the component compounds are summarized in Table 2 on the basis of advantageous effects of the invention. In Table 2, a symbol L stands for "large" or "high," a symbol M stands for "medium" and a symbol S stands for "small" or "low." The symbols L, M and S represent a classification based on a qualitative comparison among the component compounds, and 0 (zero) means that "a value is zero or nearly zero."

TABLE 2

Characteristics of liquid crystal compounds

| Characteristics | Compound (1) | Compound (2) | Compound (3) | Compound (4) |
|---|---|---|---|---|
| Maximum temperature | M to L | M | S to L | S to L |
| Viscosity | M to L | S | M to L | S to M |
| Optical anisotropy | M to L | S | M to L | S to L |
| Dielectric anisotropy | L[1)] | 0 | M to L[1)] | 0 |
| Specific resistance | L | L | L | L |

[1)] A value of dielectric anisotropy is negative, and the symbol shows magnitude of an absolute value.

Upon mixing the component compounds with the composition, the main effects of the component compounds on the characteristics of the composition are as described below. Compound (1) increases the dielectric anisotropy. Compound (2) decreases the viscosity. Compound (3) increases the dielectric anisotropy and decreases the minimum temperature. Compound (4) increases the maximum temperature or decreases the viscosity. Compound (5) are polymerized to give a polymer, and the polymer shortens a response time of the device, and improves image persistence.

Third, the combination of components in the composition, a preferred proportion of the components and the basis thereof will be described. A preferred combination of the components in the composition includes a combination of the first component and the second component, a combination of the first component, the second component and the third component, a combination of the first component, the second component and the fourth component, a combination of the first component, the second component and the additive, a combination of the first component, the second component, the third component and the fourth component, a combination of the first component, the second component, the third component and the additive, a combination of the first component, the second component, the fourth component and the additive, or a combination of the first component, the second component, the third component, the fourth component and the additive. A further preferred combination includes a combination of the first component, the second component, the third component and the fourth component, or a combination of the first component, the second component, the third component, the fourth component and the additive.

A preferred proportion of the first component is about 3% by weight or more for increasing the dielectric anisotropy, and about 25% by weight or less for decreasing the viscosity. A further preferred proportion is in the range from about 3% by weight to about 20% by weight. A particularly preferred proportion is in the range from about 3% by weight to about 15% by weight.

A preferred proportion of the second component is about 15% by weight or more for decreasing the viscosity, and about 70% by weight or less for increasing the dielectric anisotropy. A further preferred proportion is in the range from about 15% by weight to about 60% by weight. A particularly preferred proportion is in the range from about 20% by weight to about 50% by weight.

A preferred proportion of the third component is about 20% by weight or more for increasing the dielectric anisotropy, and about 75% by weight or less for decreasing the minimum temperature. A further preferred proportion is in the range from about 25% by weight to about 70% by weight. A particularly preferred proportion is in the range from about 30% by weight to about 65% by weight.

A preferred proportion of the fourth component is about 2% by weight or more for increasing the maximum temperature or decreasing the viscosity, and about 30% by weight or less for increasing the dielectric anisotropy. A further preferred proportion is in the range from about 4% by weight to about 25% by weight. A particularly preferred proportion is in the range from about 4% by weight to about 20% by weight.

An additive is added to the composition for the purpose of adapting the composition to the polymer sustained alignment mode device. A preferred proportion of the additive is about 0.03% by weight or more for aligning the liquid crystal molecules, and about 10% by weight or less for preventing poor display in the device. A further preferred proportion is in the range from about 0.1% by weight to about 2% by weight. A particularly preferred proportion is in the range from about 0.2% by weight to about 1.0% by weight.

Fourth, the preferred embodiment of the component compounds will be described. In formula (1), formula (2), formula (3) and formula (4), $R^1$, $R^2$, $R^5$ and $R^6$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine. Preferred $R^1$, $R^2$, $R^5$ or $R^6$ is alkyl having 1 to 12 carbons for increasing the stability to ultraviolet light and heat, and alkoxy having 1 to 12 carbons for increasing the dielectric anisotropy. $R^3$ is alkyl having 1 to 12 carbons, alkenyl having 2 to 12 carbons, or alkenyl having 2 to 12 carbons in which at least one hydrogen is replaced by fluorine or chlorine. Preferred $R^3$ is alkyl having 1 to 12 carbons for increasing the stability to ultraviolet light and heat, and alkenyl having 2 to 12 carbons or alkenyl having 2 to 12 carbons in which at least one hydrogen is replaced by fluorine or chlorine for decreasing the viscosity. $R^4$ is alkenyl having 2 to 12 carbons or alkenyl having 2 to 12 carbons in which at least one hydrogen is replaced by fluorine or chlorine. Preferred $R^4$ is vinyl, 1-propenyl or 2,2-difluorovinyl for decreasing the viscosity. $R^7$ and $R^8$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine. Preferred $R^7$ or $R^8$ is alkenyl having 2 to 12 carbons for decreasing the viscosity, and alkyl having 1 to 12 carbons for increasing the stability to ultraviolet light and heat.

Preferred alkyl is methyl, ethyl, propyl, butyl, pentyl, hexyl, heptyl or octyl. Further preferred alkyl is methyl, ethyl, propyl, butyl or pentyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH=CH— in the alkenyl depends on a position of a double bond. Trans is preferred in alkenyl such as 1-propenyl, 1-butenyl, 1-pentenyl, 1-hexenyl, 3-pentenyl and 3-hexenyl for decreasing the viscosity, for instance. Cis is preferred in alkenyl such as 2-butenyl, 2-pentenyl and 2-hexenyl.

Preferred examples of alkyl in which at least one hydrogen is replaced by fluorine or chlorine are fluoromethyl, 2-fluoroethyl, 3-fluoropropyl, 4-fluorobutyl, 5-fluoropentyl, 6-fluorohexyl, 7-fluoroheptyl or 8-fluorooctyl. Further preferred examples are 2-fluoroethyl, 3-fluoropropyl, 4-fluorobutyl or 5-fluoropentyl for increasing the dielectric anisotropy.

Preferred examples of alkenyl in which at least one hydrogen is replaced by fluorine or chlorine are 2,2-difluorovinyl, 3,3-difluoro-2-propenyl, 4,4-difluoro-3-butenyl, 5,5-difluoro-4-pentenyl or 6,6-difluoro-5-hexenyl. Further preferred examples are 2,2-difluorovinyl or 4,4-difluoro-3-butenyl for decreasing the viscosity.

Ring A is 1,4-cyclohexylene, 1,4-phenylene, 2-fluoro-1,4-phenylene, 2,3-difluoro-1,4-phenylene, tetrahydropyran-2,5-diyl, pyrimidine-2,5-diyl or pyridine-2,5-diyl. Preferred ring A is 1,4-cyclohexylene for decreasing the viscosity, and 1,4-phenylene for increasing the optical anisotropy.

Ring B and ring D are independently 1,4-cyclohexylene, 1,4-cyclohexenylene, 1,4-phenylene, tetrahydropyran-2,5-diyl, 1,4-phenylene in which at least one hydrogen is replaced by fluorine or chlorine, naphthalene-2,6-diyl, naphthalene-2,6-diyl in which at least one hydrogen is replaced by fluorine or chlorine, chroman-2,6-diyl, or chroman-2,6-diyl in which at least one hydrogen is replaced by fluorine or chlorine. Preferred ring B or ring D is 1,4-cyclohexylene for decreasing the viscosity, tetrahydropyran-2,5-diyl for increasing the dielectric anisotropy, and 1,4-phenylene for increasing the optical anisotropy. Ring C is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Preferred ring C is 2,3-difluoro-1,4-phenylene for decreasing the viscosity, 2-chloro-3-fluoro-1,4-phenylene for decreasing the optical anisotropy, and 7,8-difluorochroman-2,6-diyl for increasing the dielectric anisotropy.

Ring E and ring F are independently 1,4-cyclohexylene, 1,4-phenylene, 2-fluoro-1,4-phenylene or 2,5-difluoro-1,4-phenylene. Preferred ring E or ring F is 1,4-cyclohexylene for decreasing the viscosity or increasing the maximum temperature, and 1,4-phenylene for decreasing the minimum temperature.

$Z^1$, $Z^2$ and $Z^3$ are independently a single bond, ethylene, carbonyloxy or methyleneoxy. Preferred $Z^1$ is ethylene or methyleneoxy. Preferred $Z^2$ or $Z^3$ is a single bond for decreasing the viscosity, ethylene for decreasing the minimum temperature, and methyleneoxy for increasing the dielectric anisotropy. $Z^4$ is a single bond, ethylene or carbonyloxy. Preferred $Z^4$ is a single bond for increasing the stability to ultraviolet light and heat.

Then, a is 1, 2 or 3, b is 0 or 1, and a sum of a and b is 3 or less. Preferred a or b is 1 for decreasing the viscosity, and 2 or 3 for increasing the maximum temperature. Then, c is 1, 2 or 3. Preferred c is 1 for decreasing the viscosity, and 2 or 3 for increasing the maximum temperature.

In formula (5), $p^1$, $p^2$ and $p^3$ are independently a polymerizable group. Preferred $p^1$, $p^2$ or $p^3$ is a group selected from the group of polymerizable groups represented by formula (P-1) to formula (P-5). Further preferred $p^1$, $p^2$ or $p^3$ is a group represented by formula (P-1), formula (P-2) or formula (P-3). Particularly preferred $p^1$, $p^2$ or $p^3$ is a group represented by formula (P-1) or formula (P-2). Most Preferred $p^1$, $p^2$ or $p^3$ is a group represented by formula (P-1). A preferred group represented by formula (P-1) is —OCO—CH=CH$_2$ or —OCO—C(CH$_3$)=CH$_2$. A wavy line in formula (P-1) to formula (P-5) represents a site to form a bonding.

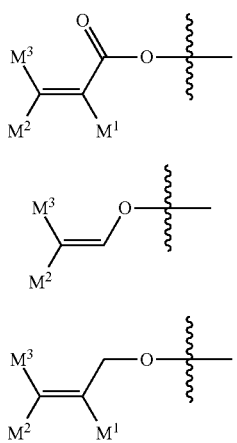

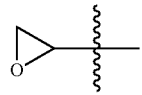

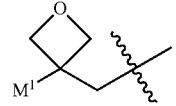

In formula (P-1) to formula (P-5), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine. Preferred $M^1$, $M^2$ or $M^3$ is hydrogen or methyl for increasing reactivity. Further preferred $M^1$ is hydrogen or methyl, and further preferred $M^2$ or $M^3$ is hydrogen.

$Sp^1$, $Sp^2$ and $Sp^3$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$—CH$_2$— may be replaced by —CH=CH— or —C≡C—, and in these groups, at least one hydrogen may be replaced by fluorine or chlorine. Preferred $Sp^1$, $Sp^2$ or $Sp^3$ is a single bond, —CH$_2$—CH$_2$—, —CH$_2$O—, —OCH$_2$—, —COO—, —OCO—, —CO—CH=CH— or —CH=CH—CO—. Further preferred $Sp^1$, $Sp^2$ or $Sp^3$ is a single bond.

Ring G and ring J are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine. Preferred ring G or ring J is phenyl. Ring I is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine. Preferred ring I is 1,4-phenylene or 2-fluoro-1,4-phenylene.

$Z^5$ and $Z^6$ are independently a single bond or alkylene having 1 to 10 carbons, and in the alkylene, at least one piece of —CH$_2$— may be replaced by —O—, —CO—, —COO— or —OCO—, and at least one piece of —CH$_2$—CH$_2$— may be replaced by —CH=CH—, —C(CH$_3$)=CH—, —CH=C(CH$_3$)— or —C(CH$_3$)=C(CH$_3$)—, and in these groups, at least one hydrogen may be replaced by fluorine or chlorine. Preferred $Z^5$ or $Z^6$ is a single bond, —CH$_2$—CH$_2$—, —CH$_2$O—, —OCH$_2$—, —COO— or —OCO—. Further preferred $Z^5$ or $Z^6$ is a single bond.

Then, d is 0, 1 or 2. Preferred d is 0 or 1. Then, e, f and g are independently 0, 1, 2, 3 or 4, and a sum of e, f and g is 1 or more. Preferred e or g is 1 or 2, and preferred f is 0 or 1.

A compound represented by formula (1) and a compound represented by formula (3) are overlapped in several cases. Such a compound is regarded to belong to the compound represented by formula (1). Namely compounds represented by formula (1) are excluded from compounds represented by formula (3):

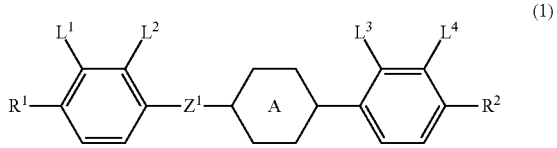
(1)

in which, in formula (1), $R^1$ and $R^2$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine; ring A is 1,4-cyclohexylene, 1,4-phenylene, 2-fluoro-1,4-phenylene, 2,3-difluoro-1,4-phenylene, tetrahydropyran-2,5-diyl, pyrimidine-2,5-diyl or pyridine-2,5-diyl; $L^1$, $L^2$, $L^3$ and $L^4$ are independently hydrogen or fluorine, in which at least three thereof is fluorine; and $Z^1$ is a single bond, ethylene, carbonyloxy or methyleneoxy.

When the compound represented by formula (4) is a compound having two rings, namely c in the formula is 1, ring F represents 1,4-phenylene.

Fifth, the preferred component compound will be described. Preferred compound (1) includes compound (1-1) to compound (1-8) described in item 2. In the above compounds, at least one of the first components preferably includes compound (1-1), compound (1-3) or compound (1-6). At least two of the first components preferably includes a combination of compound (1-3) and compound (1-6).

Preferred compound (2) includes compound (2-1) to compound (2-18) described in item 3. In the above compounds, at least one of the second components preferably includes compound (2-1), compound (2-2), compound (2-4), compound (2-5) or compound (2-14). At least two of the second components preferably includes a combination of compound (2-2) and compound (2-14).

Preferred compound (3) includes compound (3-1) to compound (3-22) described in item 6. In the above compounds, at least one of the third components preferably includes compound (3-1), compound (3-2), compound (3-3), compound (3-4), compound (3-6), compound (3-7), compound (3-8) or compound (3-10). At least two of the third components preferably includes a combination of compound (3-1) and compound (3-6), a combination of compound (3-1) and compound (3-10), a combination of compound (3-3) and compound (3-6), a combination of compound (3-3) and compound (3-10), a combination of compound (3-4) and compound (3-6), or a combination of compound (3-4) and compound (3-10).

Preferred compound (4) includes compound (4-1) to compound (4-12) described in item 9. In the above compounds, at least one of the fourth components preferably includes compound (4-2), compound (4-4), compound (4-5) or compound (4-6). At least two of the fourth components preferably includes a combination of compound (4-2) and compound (4-4), or a combination of compound (4-2) and compound (4-6).

Preferred compound (5) includes compound (5-1) to compound (5-27) described in item 13. In the above compounds, at least one of the additives preferably includes compound (5-1), compound (5-2), compound (5-24), compound (5-25), compound (5-26) or compound (5-27). At least two of the additives preferably includes a combination of compound (5-1) and compound (5-2), a combination of compound (5-1) and compound (5-18), a combination of compound (5-2) and compound (5-24), a combination of compound (5-2) and compound (5-25), a combination of compound (5-2) and compound (5-26), a combination of compound (5-25) and compound (5-26), or a combination of compound (5-18) and compound (5-24).

Sixth, the additive that may be added to the composition will be described. Such an additive includes the optically active compound, the antioxidant, the ultraviolet light absorber, the dye, the antifoaming agent, the polymerizable compound, the polymerization initiator, the polymerization inhibitor and the polar compound. The optically active compound is added to the composition for the purpose of inducing a helical structure in liquid crystal molecules to give a twist angle. Examples of such a compound include compound (6-1) to compound (6-5). A preferred proportion of the optically active compound is about 5% by weight or less. A further preferred proportion is in the range from about 0.01% by weight to about 2% by weight.

(6-1)

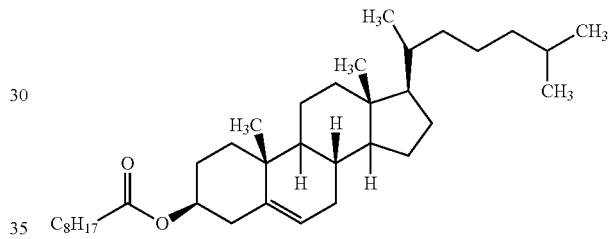
(6-2)

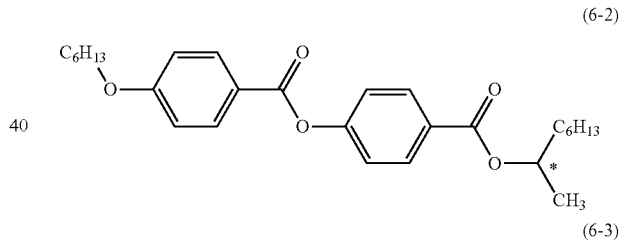
(6-3)

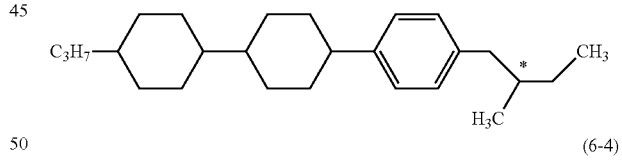
(6-4)

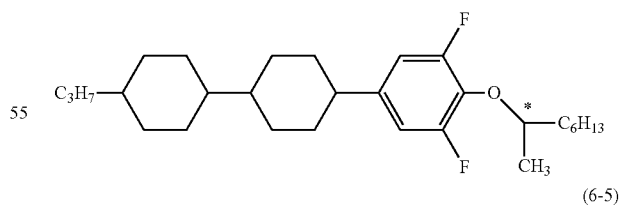
(6-5)

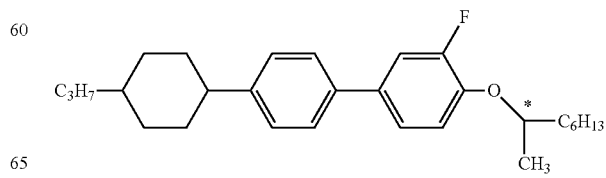

The antioxidant is added to the composition for preventing a decrease in the specific resistance caused by heating in air, or for maintaining a large voltage holding ratio at room temperature and also at a temperature close to the maximum temperature even after the device has been used for a long period of time. Preferred examples of the antioxidant include compound (7) in which n is an integer from 1 to 9.

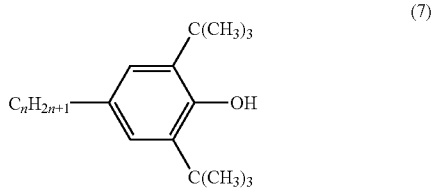 (7)

In compound (7), preferred n is 1, 3, 5, 7 or 9. Further preferred n is 7. Compound (7) in which n is 7 has low volatility, and therefore is effective in maintaining a large voltage holding ratio at room temperature and also at a temperature close to the maximum temperature even after the device has been used for a long period of time. A preferred proportion of the antioxidant is about 50 ppm or more for achieving an effect thereof, and about 600 ppm or less for avoiding a decrease in the maximum temperature or an increase in the minimum temperature. A further preferred proportion is in the range from about 100 ppm to about 300 ppm.

Preferred examples of an ultraviolet light absorber include a benzophenone derivative, a benzoate derivative and a triazole derivative. A light stabilizer such as an amine having steric hindrance is also preferred. A preferred proportion of the absorber or the stabilizer is about 50 ppm or more for achieving an effect thereof, and about 10,000 ppm or less for avoiding a decrease in the maximum temperature or an increase in the minimum temperature. A further preferred proportion is in the range from about 100 ppm to about 10,000 ppm.

A dichroic dye such as an azo dye or an anthraquinone dye is added to the composition to be adapted for a device having a guest host (GH) mode. A preferred proportion of the dye is in the range from about 0.01% by weight to about 10% by weight. The antifoaming agent such as dimethyl silicone oil or methyl phenyl silicone oil is added to the composition for preventing foam formation. A preferred proportion of the antifoaming agent is about 1 ppm or more for achieving an effect thereof, and about 1,000 ppm or less for preventing poor display. A further preferred proportion is in the range from about 1 ppm to about 500 ppm.

The polymerizable compound is used to be adapted for a polymer sustained alignment (PSA) mode device. Compound (5) is suitable for the purpose. Any other polymerizable compound that is different from compound (5) may be added to the composition together with compound (5). In place of compound (5), any other polymerizable compound that is different from compound (5) may be added to the composition. Preferred examples of such a polymerizable compound include a compound such as acrylate, methacrylate, a vinyl compound, a vinyloxy compound, propenyl ether, an epoxy compound (oxirane, oxetane) and vinyl ketone. Further preferred examples include an acrylate derivative or a methacrylate derivative. Reactivity of polymerization or a pretilt angle of liquid crystal molecules can be adjusted by changing a kind of compound (5), or by combining a polymerizable compound different from compound (5) with compound (5) at a suitable ratio. The short response time of the device can be achieved by optimizing the pretilt angle. Alignment of the liquid crystal molecules is also stabilized, and therefore a large contrast ratio or a long service life can be achieved.

The polymerizable compound is polymerized by irradiation with ultraviolet light. The polymerizable compound may be polymerized in the presence of the initiator such as a photopolymerization initiator. Suitable conditions for polymerization, suitable types of the initiator and amounts thereof are known to those skilled in the art and are described in literature. For example, Irgacure 651 (registered trademark; BASF), Irgacure 184 (registered trademark; BASF) or Darocur 1173 (registered trademark; BASF), each being a photoinitiator, is suitable for radical polymerization. A preferred proportion of the photopolymerization initiator is in the range from about 0.1% by weight to about 5% by weight based on the weight of the polymerizable compound. A further preferred proportion is in the range from about 1% by weight to about 3% by weight.

Upon storing the polymerizable compound, the polymerization inhibitor may be added thereto for preventing polymerization. The polymerizable compound is ordinarily added to the composition without removing the polymerization inhibitor. Examples of the polymerization inhibitor include hydroquinone, a hydroquinone derivative such as methylhydroquinone, 4-t-butylcatechol, 4-methoxyphenol and phenothiazine.

The polar compound is an organic compound having polarity. Here, a compound having an ionic bond is not contained. An atom such as oxygen, sulfur and nitrogen is electrically more negative, and tends to have a partial negative charge. Carbon and hydrogen are neutral or tend to have a partial positive charge. The polarity is formed when the partial electric charge is not uniformly distributed between different kinds of atoms in the compound. For example, the polar compound has at least one of partial structures such as —OH, —COOH, —SH, —NH$_2$, >NH and >N—.

Seventh, the methods for synthesizing the component compounds will be described. The compounds can be prepared according to known methods. Examples of the synthetic methods are described. Compound (1-1) is prepared by the method described in WO 2009/125668 A. Compound (2) is prepared by the method described in JP S59-176221 A or JP H9-77692 A. Compound (3-6) is prepared by the method described in JP 2000-53602 A. Compound (4-2) is prepared by the method described in JP S52-53783 A. Compound (5-18) is prepared by the method described in JP H7-101900 A. The antioxidant is commercially available. A compound in which n in formula (7) is 1 is available from Sigma-Aldrich Corporation. Compound (7) in which n is 7 or the like is prepared by a method described in U.S. Pat. No. 3,660,505 B.

Any compounds whose synthetic methods are not described above can be prepared according to methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the application of the composition will be described. Most of the compositions have a minimum temperature of about −10° C. or lower, a maximum temperature of about 70° C. or higher, and optical anisotropy in the range from about 0.07 to about 0.20. A composition having optical anisotropy in the range from about 0.08 to about 0.25 may be prepared by controlling a proportion of the component compounds or by mixing any other liquid crystal compound. Further a composition having optical anisotropy in the range from about 0.10 to about 0.30 may be prepared by trial and error. A device including the composition has the large voltage holding ratio. The composition is suitable for use in the AM device. The composition is particularly suitable for use in a transmissive AM device. The composition can be used as the composition having the nematic phase, or as the optically active composition by adding the optically active compound.

The composition can be used in the AM device. The composition can also be used in a PM device. The composition can also be used in an AM device and a PM device each having a mode such as the PC mode, the TN mode, the STN mode, the ECB mode, the OCB mode, the IPS mode, the FFS mode, the VA mode and the FPA mode. Use in the AM device having the VA mode, the OCB mode, the IPS mode or the FFS mode is particularly preferred. In the AM device having the IPS mode or the FFS mode, alignment of liquid crystal molecules when no voltage is applied may be parallel or perpendicular to a glass substrate. The devices may be of a reflective type, a transmissive type or a transflective type. Use in the transmissive device is preferred. The composition can also be used in an amorphous silicon-TFT device or a polycrystal silicon-TFT device. The composition can also be used in a nematic curvilinear aligned phase (NCAP) device prepared by microencapsulating the composition, or a polymer dispersed (PD) device in which a three-dimensional network-polymer is formed in the composition.

One example of a method for manufacturing the polymer sustained alignment mode device is as described below. A device having two substrates referred to as an array substrate and a color filter substrate is assembled. The substrates have an alignment film. At least one of the substrates has an electrode layer. The liquid crystal compound is mixed to prepare the liquid crystal composition. The polymerizable compound is added to the composition. The additive may be further added thereto when necessary. The composition is injected into the device. The device is irradiated with light in a state in which voltage is applied thereto. Ultraviolet light is preferred. The polymerizable compound is polymerized by irradiation with the light. The composition containing a polymer is formed by the polymerization. The polymer sustained alignment mode device is manufactured by such a procedure.

In the procedure, when voltage is applied, the liquid crystal molecules are aligned by action of the alignment film and an electric field. The molecules of the polymerizable compound are also aligned according to the alignment. The polymerizable compound is polymerized by ultraviolet light in the above state, and therefore the polymer maintaining the alignment is formed. The response time in the device is shortened by an effect of the polymer. Simultaneously, image persistence is also improved by the effect of the polymer, since the image persistence is poor operation of liquid crystal molecules. Moreover, the polymerizable compound in the composition is previously polymerized, and the resulting composition can be arranged between the substrates of the liquid crystal display device.

EXAMPLES

The invention will be described in greater detail by way of Examples. However, the invention is not limited by the Examples. The invention includes a mixture of a composition in Example 1 and a composition in Example 2. The invention also includes a mixture in which at least two compositions in Examples are mixed. The thus prepared compound was identified by methods such as an NMR analysis. Characteristics of the compound, the composition and a device were measured by methods described below.

NMR analysis: For measurement, DRX-500 made by Bruker BioSpin Corporation was used. In $^1$H-NMR measurement, a sample was dissolved in a deuterated solvent such as $CDCl_3$, and measurement was carried out under conditions of room temperature, 500 MHz and 16 times of accumulation. Tetramethylsilane was used as an internal standard. In $^{19}$F-NMR measurement, $CFCl_3$ was used as an internal standard, and measurement was carried out under conditions of 24 times of accumulation. In explaining nuclear magnetic resonance spectra obtained, s, d, t, q, quin, sex and m stand for a singlet, a doublet, a triplet, a quartet, a quintet, a sextet and a multiplet, and br being broad, respectively.

Gas chromatographic analysis: For measurement, GC-14B Gas Chromatograph made by Shimadzu Corporation was used. A carrier gas was helium (2 mL per minute). A sample vaporizing chamber and a detector (FID) were set to 280° C. and 300° C., respectively. A capillary column DB-1 (length 30 m, bore 0.32 mm, film thickness 0.25 μm; dimethylpolysiloxane as a stationary liquid phase; nonpolar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample vaporizing chamber. A recorder was C-R5A Chromatopac made by Shimadzu Corporation or the equivalent thereof. The resulting gas chromatogram showed a retention time of a peak and a peak area corresponding to each of the component compounds.

As a solvent for diluting the sample, chloroform, hexane or the like may also be used. The following capillary columns may also be used for separating component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of preventing an overlap of peaks of the compounds.

A proportion of liquid crystal compounds contained in the composition may be calculated by the method as described below. The mixture of the liquid crystal compounds is analyzed by gas chromatography (FID). An area ratio of each peak in the gas chromatogram corresponds to the ratio (weight ratio) of the liquid crystal compound. When the capillary columns described above were used, a correction coefficient of each of the liquid crystal compounds may be regarded as 1 (one). Accordingly, the proportion (% by weight) of the liquid crystal compounds can be calculated from the area ratio of each peak.

Sample for measurement: When characteristics of the composition and the device were measured, the composition was used as a sample as was. Upon measuring characteristics of a compound, a sample for measurement was prepared by mixing the compound (15% by weight) with a base liquid crystal (85% by weight). Values of characteristics of the compound were calculated, according to an extrapolation method, using values obtained by measurement. (Extrapolated value)={(measured value of a sample)−0.85×(measured value of a base liquid crystal)}/0.15. When a smectic phase (or crystals) precipitates at the ratio thereof at 25° C., a ratio of the compound to the base liquid crystal was changed step by step in the order of (10% by weight: 90% by weight), (5% by weight: 95% by weight) and (1% by weight: 99% by weight). Values of maximum temperature, optical anisotropy, viscosity and dielectric anisotropy with regard to the compound were determined according to the extrapolation method.

A base liquid crystal described below was used. A proportion of the component compound was expressed in terms of weight percent (% by weight).

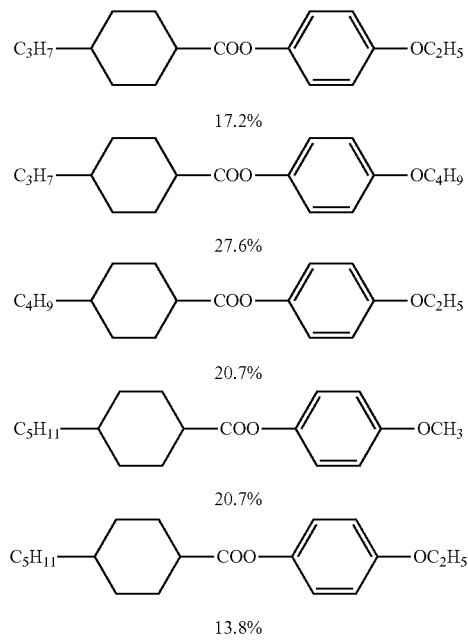

Measuring method: Characteristics were measured according to the methods described below. Most of the measuring methods are applied as described in the Standard of Japan Electronics and Information Technology Industries Association (hereinafter abbreviated as JEITA) (JEITA ED-2521B) discussed and established by JEITA, or modified thereon. No thin film transistor (TFT) was attached to a TN device used for measurement.

(1) Maximum temperature of nematic phase (NI; ° C.): A sample was placed on a hot plate in a melting point apparatus equipped with a polarizing microscope, and heated at a rate of 1° C. per minute. Temperature when part of the sample began to change from a nematic phase to an isotropic liquid was measured. A maximum temperature of the nematic phase may be occasionally abbreviated as "maximum temperature."

(2) Minimum temperature of nematic phase ($T_c$; ° C.): Samples each having a nematic phase were put in glass vials and kept in freezers at temperatures of 0° C., −10° C., −20° C., −30° C. and −40° C. for 10 days, and then liquid crystal phases were observed. For example, when the sample was maintained in the nematic phase at −20° C. and changed to crystals or a smectic phase at −30° C., $T_c$ was expressed as $T_c$<−20° C. A minimum temperature of the nematic phase may be occasionally abbreviated as "minimum temperature."

(3) Viscosity (bulk viscosity; η; measured at 20° C.; mPa·s): For measurement, a cone-plate (E type) rotational viscometer made by Tokyo Keiki Inc. was used.

(4) Viscosity (rotational viscosity; γl; measured at 25° C.; mPa·s): Measurement was carried out according to a method described in M. Imai et al., Molecular Crystals and Liquid Crystals, Vol. 259, p. 37 (1995). A sample was put in a VA device in which a distance (cell gap) between two glass substrates was 20 micrometers. Voltage was applied stepwise to the device in the range from 39 V to 50 V at an increment of 1 V. After a period of 0.2 second with no voltage application, voltage was repeatedly applied under conditions of only one rectangular wave (rectangular pulse; 0.2 second) and no voltage application (2 seconds). A peak current and a peak time of transient current generated by the applied voltage were measured. A value of rotational viscosity was obtained from the measured values and calculation equation (8) described on page 40 of the paper presented by M. Imai et al. Dielectric anisotropy required for the calculation was measured according to section (6).

(5) Optical anisotropy (refractive index anisotropy; Δn; measured at 25° C.): Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when a direction of polarized light was parallel to a direction of rubbing. A refractive index (n⊥) was measured when the direction of polarized light was perpendicular to the direction of rubbing. A value of optical anisotropy was calculated from an equation: Δn=n∥−n⊥.

(6) Dielectric anisotropy (Δε; measured at 25° C.): A value of dielectric anisotropy was calculated from an equation: Δε=ε∥−ε⊥. A dielectric constant (ε∥ and ε⊥) was measured as described below.

(1) Measurement of dielectric constant (ε∥): An ethanol (20 mL) solution of octadecyltriethoxysilane (0.16 mL) was applied to a well-cleaned glass substrate. After rotating the glass substrate with a spinner, the glass substrate was heated at 150° C. for 1 hour. A sample was put in a VA device in which a distance (cell gap) between two glass substrates was 4 micrometers, and the device was sealed with an ultraviolet-curable adhesive. Sine waves (0.5 V, 1 kHz) were applied to the device, and after 2 seconds, a dielectric constant (ε∥) of liquid crystal molecules in a major axis direction was measured.

(2) Measurement of dielectric constant (ε⊥): A polyimide solution was applied to a well-cleaned glass substrate. After calcining the glass substrate, rubbing treatment was applied to the alignment film obtained. A sample was put in a TN device in which a distance (cell gap) between two glass substrates was 9 micrometers and a twist angle was 80 degrees. Sine waves (0.5 V, 1 kHz) were applied to the device, and after 2 seconds, a dielectric constant (ε⊥) of liquid crystal molecules in a minor axis direction was measured.

(7) Threshold voltage (Vth; measured at 25° C.; V): For measurement, an LCD-5100 luminance meter made by Otsuka Electronics Co., Ltd. was used. A light source was a halogen lamp. A sample was put in a normally black mode VA device in which a distance (cell gap) between two glass substrates was 4 micrometers and a rubbing direction was anti-parallel, and the device was sealed with an ultraviolet-curable adhesive. A voltage (60 Hz, rectangular waves) to be applied to the device was stepwise increased from 0 V to 20 V at an increment of 0.02 V. On the occasion, the device was irradiated with light from a direction perpendicular to the device, and an amount of light transmitted through the device was measured. A voltage-transmittance curve was prepared, in which the maximum amount of light corresponds to 100% transmittance and the minimum amount of light corresponds to 0% transmittance. A threshold voltage is expressed in terms of voltage at 10% transmittance.

(8) Voltage holding ratio (VHR-1; measured at 25° C.; %): A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is expressed in terms of a percentage of area A to area B.

(9) Voltage holding ratio (VHR-2; measured at 80° C.; %): A voltage holding ratio was measured according to procedures identical with the procedures described above except that measurement was carried out at 80° C. in place of 25° C. The thus obtained value was expressed in terms of VHR-2.

(10) Voltage holding ratio (VHR-3; measured at 25° C.; %): Stability to ultraviolet light was evaluated by measuring a voltage holding ratio after a device was irradiated with ultraviolet light. A TN device used for measurement had a polyimide alignment film and a cell gap was 5 micrometers. A sample was injected into the device, and the device was irradiated with light for 20 minutes. A light source was an ultra high-pressure mercury lamp USH-500D (made by Ushio, Inc.), and a distance between the device and the light source was 20 centimeters. In measurement of VHR-3, a decaying voltage was measured for 16.7 milliseconds. A composition having large VHR-3 has high stability to ultraviolet light. A value of VHR-3 is preferably 90% or more, and further preferably 95% or more.

(11) Voltage holding ratio (VHR-4; measured at 25° C.; %): Stability to heat was evaluated by measuring a voltage holding ratio after a TN device into which a sample was injected was heated in a constant-temperature bath at 80° C. for 500 hours. In measurement of VHR-4, a decaying voltage was measured for 16.7 milliseconds. A composition having large VHR-4 has high stability to heat.

(12) Response time (τ; measured at 25° C.; ms): For measurement, an LCD-5100 luminance meter made by Otsuka Electronics Co., Ltd. was used. A light source was a halogen lamp. A low-pass filter was set to 5 kHz. A sample was put in a normally black mode VA device in which a distance (cell gap) between two glass substrates was 4 micrometers and a rubbing direction was anti-parallel. The device was sealed with an ultraviolet-curable adhesive. A voltage (rectangular waves; 60 Hz, 10 V, 0.5 second) was applied to the device. On the occasion, the device was irradiated with light from a direction perpendicular to the device, and an amount of light transmitted through the device was measured. The maximum amount of light corresponds to 100% transmittance, and the minimum amount of light corresponds to 0% transmittance. A response time was expressed in terms of time required for a change from 90% transmittance to 10% transmittance (fall time; millisecond).

(13) Specific resistance (ρ; measured at 25° C.; Ω cm): Into a vessel equipped with electrodes, 1.0 milliliter of sample was injected. A direct current voltage (10 V) was applied to the vessel, and a direct current after 10 seconds was measured. Specific resistance was calculated from the following equation: (specific resistance)={(voltage)×(electric capacity of a vessel)}/{(direct current)×(dielectric constant of vacuum)}.

Examples of compositions were described below. The component compounds were represented using symbols according to definitions in Table 3 described below. In Table 3, the configuration of 1,4-cyclohexylene is trans. A parenthesized number next to a symbolized compound represents a chemical formula to which the compound belongs. A symbol (–) means any other liquid crystal compound. A proportion (percentage) of the liquid crystal compound is expressed in terms of weight percent (% by weight) based on the weight of the liquid crystal composition containing no additive. Values of the characteristics of the composition were summarized in a last part.

TABLE 3

| Method for description of compounds using symbols R—(A$_1$)—Z$_1$— . . . —Z$_n$—(A$_n$)—R' | |
| --- | --- |
| 1) Left-terminal group R— | Symbol |
| F—C$_n$H$_{2n}$— | Fn- |
| C$_n$H$_{2n+1}$— | n- |
| C$_n$H$_{2n+1}$O— | nO- |
| C$_m$H$_{2m+1}$OC$_n$H$_{2n}$— | mOn- |
| CH$_2$=CH— | V- |
| C$_n$H$_{2n+1}$—CH=CH— | nV- |
| CH$_2$=CH—C$_n$H$_{2n}$— | Vn- |
| C$_m$H$_{2m+1}$—CH=CH—C$_n$H$_{2n}$— | mVn- |
| CF$_2$=CH— | VFF- |
| CF$_2$=CH—C$_n$H$_{2n}$— | VFFn- |
| CH$_2$=CH—COO— | AC- |
| CH$_2$=C(CH$_3$)—COO— | MAC- |
| 2) Right-terminal group —R' | Symbol |
| —C$_n$H$_{2n+1}$ | -n |
| —OC$_n$H$_{2n+1}$ | -On |
| —CH=CH$_2$ | -V |
| —CH=CH—C$_n$H$_{2n+1}$ | -Vn |
| —C$_n$H$_{2n}$—CH=CH$_2$ | -nV |
| —C$_m$H$_{2m}$—CH=CH—C$_n$H$_{2n+1}$ | -mVn |
| —CH=CF$_2$ | -VFF |
| —OCO—CH=CH$_2$ | -AC |
| —OCO—C(CH$_3$)=CH$_2$ | -MAC |
| 3) Bonding group —Z$_n$— | Symbol |
| —C$_n$H$_{2n}$— | n |
| —COO— | E |
| —CH=CH— | V |
| —CH=CHO— | VO |
| —OCH=CH— | OV |
| —CH$_2$O— | 1O |
| —OCH$_2$— | O1 |
| 4) Ring structure —A$_n$— | Symbol |
|  | H |
|  | B |

TABLE 3-continued

Method for description of compounds using symbols
R—(A₁)—Z₁— ... —Zₙ—(Aₙ)—R'

| Structure | Symbol |
|---|---|
| (benzene with F at one position) | B(F) |
| (benzene with F at 2 position) | B(2F) |
| (benzene with two F) | B(F,F) |
| (benzene with 2F,5F) | B(2F,5F) |
| (benzene with 2F,3F) | B(2F,3F) |
| (benzene with 2F,3Cl) | B(2F,3Cl) |
| (tetrahydropyran) | dh |
| (tetrahydropyran isomer) | Dh |
| (cyclohexene) | ch |
| (chroman with 7F,8F) | Cro(7F,8F) |

5) Examples of description

Example 1  4O-B(2F,3F)2BB(2F,3F)-O2

Example 2  3-HH-V

Example 3  V-HHB-1

Example 4  3-HHB(2F,3F)-O2

Comparative Example 1

From compositions disclosed in WO 2009/125668 A1, Example 15 was selected. The basis is that the composition contains compound (1-7) and compound (1-8) being a first component.

| Compound | Ref | % |
|---|---|---|
| 2O—B(2F,3F)O1HB(2F,3F)—O2 | (1-7) | 5% |
| 2O—B(2F,3F)O1BB(2F,3F)—O2 | (1-8) | 5% |
| 3-HB(2F,3F)—O2 | (3-1) | 12% |
| 5-HB(2F,3F)—O2 | (3-1) | 12% |
| 3-HHB(2F,3F)—O2 | (3-6) | 8% |
| 5-HHB(2F,3F)—O2 | (3-6) | 9% |
| 3-HB—O2 | (4-1) | 14% |
| 5-HB—O2 | (4-1) | 15% |
| 3-HHB-1 | (4-4) | 10% |
| 3-HHB-3 | (4-4) | 10% |

NI=82.3° C.; Tc<−20° C.; η=25.4 mPa·s; Δn=0.099; Δε=−3.3.

Example 1

| Compound | Ref | % |
|---|---|---|
| 2O—B(2F,3F)O1HB(2F,3F)—O2 | (1-7) | 5% |
| 2O—B(2F,3F)O1BB(2F,3F)—O2 | (1-8) | 5% |
| 3-HH—V | (2-14) | 29% |
| 3-HB(2F,3F)—O2 | (3-1) | 12% |
| 5-HB(2F,3F)—O2 | (3-1) | 12% |
| 3-HHB(2F,3F)—O2 | (3-6) | 8% |
| 5-HHB(2F,3F)—O2 | (3-6) | 9% |
| 3-HHB-1 | (4-4) | 10% |
| 3-HHB-3 | (4-4) | 10% |

NI=84.8° C.; Tc<−20° C.; η=19.1 mPa·s; Δn=0.068; Δε=−2.9.

Example 2

| 2O—B(2F,3F)2BB(2F,3F)—O2 | (1-6) | 3% |
| 4O—B(2F,3F)2BB(2F,3F)—O2 | (1-6) | 4% |
| 3-HH—V | (2-14) | 32% |
| V—HB(2F,3F)—O2 | (3-1) | 6% |
| 3-BB(2F,3F)—O2 | (3-4) | 7% |
| V2—BB(2F,3F)—O2 | (3-4) | 8% |
| 2-HHB(2F,3F)—O2 | (3-6) | 3% |
| 3-HHB(2F,3F)—O2 | (3-6) | 8% |
| V—HHB(2F,3F)—O2 | (3-6) | 10% |
| V—HHB(2F,3F)—O4 | (3-6) | 6% |
| 3-HBB(2F,3F)—O2 | (3-10) | 7% |
| 3-DhB(F)B(2F,3F)—O2 | (3) | 4% |
| V—HHB-1 | (4-4) | 2% |

NI=75.3° C.; Tc<−20° C.; η=15.3 mPa·s; Δn=0.106; Δε=−4.2.

Example 3

| 2O—B(2F,3F)2HB(2F,3F)—O2 | (1-3) | 3% |
| 2O—B(2F,3F)O1BB(2F,3F)—O2 | (1-8) | 4% |
| 3-HH—V | (2-14) | 33% |
| 3-H2B(2F,3F)—O2 | (3-2) | 3% |
| 3-BB(2F,3F)—O2 | (3-4) | 5% |
| 5-BB(2F,3F)—O2 | (3-4) | 4% |
| 3-HHB(2F,3F)—O2 | (3-6) | 5% |
| V—HHB(2F,3F)—O2 | (3-6) | 5% |
| 3-HH2B(2F,3F)—O2 | (3-7) | 3% |
| 5-HH2B(2F,3F)—O2 | (3-7) | 3% |
| V—HH1OB(2F,3F)—O2 | (3-8) | 3% |
| 2-HBB(2F,3F)—O2 | (3-10) | 5% |
| 3-HHB(2F,3Cl)—O2 | (3-12) | 2% |
| 5-HHB(2F,3Cl)—O2 | (3-12) | 3% |
| 3-HchB(2F,3F)—O2 | (3-19) | 2% |
| 3-BB(2F)B(2F,3F)—O2 | (3-20) | 4% |
| 3-BB(F)B(2F,3F)—O2 | (3-21) | 2% |
| 3-dhB(F)B(2F,3F)—O2 | (3) | 3% |
| 5-HB—O2 | (4-1) | 2% |
| V2—BB-1 | (4-2) | 2% |
| 3-HBB-2 | (4-5) | 4% |

NI=82.6° C.; Tc<−20° C.; η=14.3 mPa·s; Δn=0.111; Δε=−3.7.

Example 4

| 2O—B(2F,3F)2BB(2F,3F)—O2 | (1-6) | 4% |
| 4O—B(2F,3F)2BB(2F,3F)—O2 | (1-6) | 6% |
| 3-HH—V | (2-14) | 29% |
| 3-HH—V1 | (2-15) | 11% |
| 3-HH—VFF | (2-18) | 5% |
| V—HB(2F,3F)—O2 | (3-1) | 3% |
| 3-H1OB(2F,3F)—O2 | (3-3) | 3% |
| 3-B(2F,3F)B(2F,3F)—O2 | (3-5) | 3% |
| 3-HHB(2F,3F)—O2 | (3-6) | 8% |
| 4-HHB(2F,3F)—O2 | (3-6) | 4% |
| 3-HH1OB(2F,3F)—O2 | (3-8) | 4% |
| 2-BB(2F,3F)B-3 | (3-9) | 3% |
| 3-HBB(2F,3Cl)—O2 | (3-13) | 2% |
| 5-HBB(2F,3Cl)—O2 | (3-13) | 2% |
| 3-HH1OCro(7F,8F)-5 | (3-15) | 2% |
| 3-B(2F)B(2F,3F)—O2 | (3-22) | 2% |
| 3-DhB(F)B(2F,3F)—O2 | (3) | 3% |
| V2—HHB-1 | (4-4) | 2% |

-continued

| 1-BB(F)B—2V | (4-6) | 2% |
| V2—BB2B-1 | (4-8) | 2% |

NI=76.9° C.; Tc<−20° C.; η=12.1 mPa·s; Δn=0.102; Δε=−3.5.

Example 5

| 2O—B(2F,3F)2HB(2F,3F)—O2 | (1-3) | 2% |
| 2O—B(2F,3F)O1HB(2F,3F)—O2 | (1-7) | 2% |
| 4O—B(2F,3F)O1BB(2F,3F)—O2 | (1-8) | 2% |
| 3-HH—V | (2-14) | 28% |
| 3-HB(2F,3F)—O2 | (3-1) | 4% |
| 5-HB(2F,3F)—O2 | (3-1) | 5% |
| 2-HHB(2F,3F)—O2 | (3-6) | 3% |
| 3-HHB(2F,3F)—O2 | (3-6) | 3% |
| 2-HBB(2F,3F)—O2 | (3-10) | 6% |
| 3-HBB(2F,3F)—O2 | (3-10) | 8% |
| 3-HEB(2F,3F)B(2F,3F)—O2 | (3-11) | 3% |
| 3-H1OCro(7F,8F)-5 | (3-14) | 2% |
| 3-chB(2F,3F)—O2 | (3-18) | 3% |
| V—chB(2F,3F)—O2 | (3-18) | 3% |
| 3-DhB(2F)B(2F,3F)—O2 | (3) | 4% |
| 3-HHEH-3 | (4-3) | 3% |
| 5-B(F)BB-3 | (4-7) | 3% |
| 5-B(F)BH-3 | (4-11) | 3% |
| 2-HH-3 | (—) | 10% |
| 1O1—HBBH-5 | (—) | 3% |

NI=80.1° C.; Tc<−20° C.; η=15.8 mPa·s; Δn=0.103; Δε=−3.4.

Example 6

| 2O—B(2F,3F)2BB(2F,3F)—O2 | (1-6) | 3% |
| 4O—B(2F,3F)2BB(2F,3F)—O2 | (1-6) | 4% |
| 2O—B(2F,3F)O1HB(2F,3F)—O2 | (1-7) | 3% |
| 3-HH—V | (2-14) | 24% |
| 3-HH—V1 | (2-15) | 5% |
| 3-HB(2F,3F)—O2 | (3-1) | 3% |
| 3-BB(2F,3F)—O2 | (3-4) | 3% |
| 5-BB(2F,3F)—O2 | (3-4) | 3% |
| 2-HHB(2F,3F)—O2 | (3-6) | 4% |
| 3-HHB(2F,3F)—O2 | (3-6) | 8% |
| V—HHB(2F,3F)—O2 | (3-6) | 3% |
| V—HH1OB(2F,3F)—O2 | (3-8) | 3% |
| 2-HBB(2F,3F)—O2 | (3-10) | 5% |
| 3-HBB(2F,3F)—O2 | (3-10) | 8% |
| 3-DhB(F)B(2F,3F)—O2 | (3) | 3% |
| 1-BB-3 | (4-2) | 3% |
| 1-BB-5 | (4-2) | 3% |
| 3-HHB-1 | (4-4) | 3% |
| 3-HHEBH-3 | (4-10) | 4% |
| 2-HH-3 | (—) | 5% |

NI=88.2° C.; Tc<−20° C.; η=14.7 mPa·s; Δn=0.110; Δε=−3.7.

Example 7

| 2O—B(2F,3F)2BB(2F,3F)—O2 | (1-6) | 3% |
| 4O—B(2F,3F)2BB(2F,3F)—O2 | (1-6) | 2% |
| 3-HH—V | (2-14) | 29% |
| 3-HH—V1 | (2-15) | 6% |
| 3-HB(2F,3F)—O2 | (3-1) | 5% |
| 3-BB(2F,3F)—O2 | (3-4) | 5% |
| 2-HHB(2F,3F)—O2 | (3-6) | 5% |

-continued

| | | |
|---|---|---|
| 3-HHB(2F,3F)—O2 | (3-6) | 7% |
| 2-HBB(2F,3F)—O2 | (3-10) | 5% |
| 3-HBB(2F,3F)—O2 | (3-10) | 10% |
| 5-BB(2F)B(2F,3F)—O2 | (3-20) | 2% |
| 3-BB(F)B(2F,3F)—O2 | (3-21) | 2% |
| 3-DhB(2F)B(2F,3F)—O2 | (3) | 5% |
| 3-HB—O2 | (4-1) | 3% |
| 3-HB(F)HH-2 | (4-9) | 3% |
| 3-HBB(F)B-2 | (4-12) | 3% |
| 2-HH-3 | (—) | 5% |

NI=86.2° C.; Tc<−20° C.; η=13.9 mPa·s; Δn=0.111; Δε=−3.3.

Example 8

| | | |
|---|---|---|
| 2O—B(2F,3F)2HB(2F,3F)—O2 | (1-3) | 2% |
| 2O—B(2F,3F)2BB(2F,3F)—O2 | (1-6) | 2% |
| 4O—B(2F,3F)2BB(2F,3F)—O2 | (1-6) | 2% |
| 6O—B(2F,3F)2BB(2F,3F)—O2 | (1-6) | 2% |
| 2O—B(2F,3F)O1HB(2F,3F)—O2 | (1-7) | 2% |
| 2O—B(2F,3F)O1BB(2F,3F)—O2 | (1-8) | 2% |
| 3-HH—V | (2-14) | 29% |
| V—HB(2F,3F)—O2 | (3-1) | 3% |
| 5-HB(2F,3F)—O2 | (3-1) | 2% |
| 5-H2B(2F,3F)—O2 | (3-2) | 2% |
| 2-H1OB(2F,3F)—O2 | (3-3) | 3% |
| 3-HHB(2F,3F)—O2 | (3-6) | 7% |
| 4-HHB(2F,3F)—O2 | (3-6) | 2% |
| 2-HH1OB(2F,3F)—O2 | (3-8) | 3% |
| 3-HBB(2F,3F)—O2 | (3-10) | 8% |
| 3-HH1OCro(7F,8F)-5 | (3-15) | 3% |
| 3-HchB(2F,3F)—O2 | (3-19) | 3% |
| 3-DhB(F)B(2F,3F)—O2 | (3) | 3% |
| V—HBB-3 | (4-5) | 5% |
| 2-BB(F)B—2V | (4-6) | 3% |
| 3-BB(F)B—2V | (4-6) | 3% |
| 2-HH-3 | (—) | 9% |

NI=81.5° C.; Tc<−20° C.; η=16.0 mPa·s; Δn=0.106; Δε=−3.7.

Example 9

| | | |
|---|---|---|
| 2O—B(2F,3F)O1HB(2F,3F)—O2 | (1-7) | 3% |
| 2O—B(2F,3F)O1BB(2F,3F)—O2 | (1-8) | 3% |
| 3-HH—V | (2-14) | 33% |
| V—HB(2F,3F)—O2 | (3-1) | 5% |
| 3-HB(2F,3F)—O2 | (3-1) | 7% |
| 3-HHB(2F,3F)—O2 | (3-6) | 6% |
| 4-HHB(2F,3F)—O2 | (3-6) | 3% |
| V—HHB(2F,3F)—O2 | (3-6) | 3% |
| 3-HBB(2F,3F)—O2 | (3-10) | 6% |
| 5-HBB(2F,3F)—O2 | (3-10) | 7% |
| 3-H1OCro(7F,8F)-5 | (3-14) | 2% |
| 3-HDhB(2F,3F)—O2 | (3-16) | 3% |
| 3-dhBB(2F,3F)—O2 | (3-17) | 2% |
| 5-HchB(2F,3F)—O2 | (3-19) | 3% |
| 3-dhB(F)B(2F,3F)—O2 | (3) | 3% |
| 3-HBB-2 | (4-5) | 8% |
| F3-HH—V | (—) | 3% |

NI=84.8° C.; Tc<−20° C.; η=15.0 mPa·s; Δn=0.101; Δε=−3.7.

Example 10

| | | |
|---|---|---|
| 2O—B(2F,3F)2BB(2F,3F)—O2 | (1-6) | 3% |
| 6O—B(2F,3F)2BB(2F,3F)—O2 | (1-6) | 4% |
| 3-HH—V | (2-14) | 20% |
| 3-HH—V1 | (2-15) | 8% |
| 5-HH—V | (2) | 3% |
| 5-HB(2F,3F)—O2 | (3-1) | 4% |
| 3-H1OB(2F,3F)—O2 | (3-3) | 3% |
| 3-BB(2F,3F)—O2 | (3-4) | 8% |
| 2O—BB(2F,3F)—O2 | (3-4) | 5% |
| 4-HHB(2F,3F)—O2 | (3-6) | 4% |
| V—HHB(2F,3F)—O2 | (3-6) | 10% |
| 3-HBB(2F,3F)—O2 | (3-10) | 5% |
| 4-HBB(2F,3F)—O2 | (3-10) | 5% |
| 3-DhB(F)B(2F,3F)—O4 | (3) | 3% |
| 1V2—BB-1 | (4-2) | 3% |
| 3-HHEBH-4 | (4-10) | 3% |
| 5-HBB(F)B-3 | (4-12) | 3% |
| 2-HH-5 | (—) | 3% |
| 3-HH-4 | (—) | 3% |

NI=84.6° C.; Tc<−20° C.; η=13.7 mPa·s; Δn=0.112; Δε=−3.7.

Example 11

| | | |
|---|---|---|
| 4O—B(2F,3F)2BB(2F,3F)—O2 | (1-6) | 5% |
| 6O—B(2F,3F)2BB(2F,3F)—O2 | (1-6) | 5% |
| 3-HH—V | (2-14) | 32% |
| 3-HB(2F,3F)—O2 | (3-1) | 10% |
| 3-H2B(2F,3F)—O2 | (3-2) | 4% |
| 2O—BB(2F,3F)—O2 | (3-4) | 5% |
| 3-HHB(2F,3F)—O2 | (3-6) | 12% |
| 2-BB(2F,3F)B-3 | (3-9) | 3% |
| 2-BB(2F,3F)B-4 | (3-9) | 3% |
| V—HBB(2F,3F)—O2 | (3-10) | 5% |
| 3-HEB(2F,3F)B(2F,3F)—O2 | (3-11) | 2% |
| V2—HchB(2F,3F)—O2 | (3-19) | 3% |
| 5-DhB(2F)B(2F,3F)—O2 | (3) | 3% |
| 5-B(F)BB-2 | (4-7) | 2% |
| 3-HHEBH-5 | (4-10) | 3% |
| 5-HH—O1 | (—) | 3% |

NI=80.3° C.; Tc<−20° C.; η=15.0 mPa·s; Δn=0.112; Δε=−3.7.

Example 12

| | | |
|---|---|---|
| 2O—B(2F,3F)2HB(2F,3F)—O2 | (1-3) | 3% |
| 2O—B(2F,3F)2BB(2F,3F)—O2 | (1-6) | 3% |
| 4O—B(2F,3F)2BB(2F,3F)—O2 | (1-6) | 3% |
| 2O—B(2F,3F)O1BB(2F,3F)—O2 | (1-8) | 2% |
| 3-HH—V | (2-14) | 23% |
| 5-HB(2F,3F)—O2 | (3-1) | 2% |
| 3-BB(2F,3F)—O2 | (3-4) | 5% |
| 2-HHB(2F,3F)—O2 | (3-6) | 4% |
| V—HHB(2F,3F)—O2 | (3-6) | 4% |
| V—HHB(2F,3F)—O4 | (3-6) | 5% |
| 3-HBB(2F,3F)—O2 | (3-10) | 10% |
| 5-HBB(2F,3F)—O2 | (3-10) | 5% |
| 3-DhB(2F)B(2F,3F)—O2 | (3) | 3% |
| 7-HB-1 | (4-1) | 3% |
| 1-BB-3 | (4-2) | 3% |
| 3-HHEH-5 | (4-3) | 3% |
| 3-HHB-3 | (4-4) | 3% |
| V2—HHB-1 | (4-4) | 3% |
| 2-BB(F)B-3 | (4-6) | 3% |
| 2-HH-3 | (—) | 10% |

NI=84.2° C.; Tc<−20° C.; η=14.3 mPa·s; Δn=0.110; Δε=−3.4.

Example 13

| | | |
|---|---|---|
| 2O—B(2F,3F)2BB(2F,3F)—O2 | (1-6) | 3% |
| 4O—B(2F,3F)2BB(2F,3F)—O2 | (1-6) | 4% |
| 6O—B(2F,3F)2BB(2F,3F)—O2 | (1-6) | 5% |
| 3-HH—V | (2-14) | 32% |
| 3-HH—V1 | (2-15) | 9% |
| 3-HB(2F,3F)—O2 | (3-1) | 8% |
| 2O—BB(2F,3F)—O2 | (3-4) | 3% |
| 3-HHB(2F,3F)—O2 | (3-6) | 6%. |
| 3-HBB(2F,3F)—O2 | (3-10) | 6% |
| V—HBB(2F,3F)—O2 | (3-10) | 5% |
| 3-H1OCro(7F,8F)-5 | (3-14) | 2% |
| 3-HH1OCro(7F,8F)-5 | (3-15) | 2% |
| 3-DhB(F)B(2F,3F)—O1 | (3) | 3% |
| 3-HHB—O1 | (4-4) | 3% |
| VFF—HHB-1 | (4-4) | 3% |
| V—HBB-3 | (4-5) | 3% |
| 2-BB(F)B-5 | (4-6) | 3% |

NI=81.8° C.; Tc<−20° C.; η=13.3 mPa·s; Δn=0.109; Δε=−3.4.

Example 14

| | | |
|---|---|---|
| 2O—B(2F,3F)2BB(2F,3F)—O2 | (1-6) | 3% |
| 6O—B(2F,3F)2BB(2F,3F)—O2 | (1-6) | 4% |
| 2O—B(2F,3F)O1HB(2F,3F)—O2 | (1-7) | 3% |
| 3-HH—V | (2-14) | 29% |
| 2-H1OB(2F,3F)—O2 | (3-3) | 2% |
| 3-H1OB(2F,3F)—O2 | (3-3) | 2% |
| 3-BB(2F,3F)—O2 | (3-4) | 2% |
| 2-HHB(2F,3F)—O2 | (3-6) | 3% |
| 3-HHB(2F,3F)—O2 | (3-6) | 3% |
| 4-HHB(2F,3F)—O2 | (3-6) | 4% |
| 2-BB(2F,3F)B-3 | (3-9) | 3% |
| 2-HBB(2F,3F)—O2 | (3-10) | 7% |
| 3-HBB(2F,3F)—O2 | (3-10) | 7% |
| 5-HBB(2F,3F)—O2 | (3-10) | 8% |
| 3-chB(2F,3F)—O2 | (3-18) | 3% |
| 3-dhB(F)B(2F,3F)—O2 | (3) | 3% |
| 3-HB—O2 | (4-1) | 2% |
| V—HBB-2 | (4-5) | 3% |
| 2-HH-3 | (—) | 9% |

NI=81.6° C.; Tc<−20° C.; η=14.5 mPa·s; Δn=0.111; Δε=−3.8.

Example 15

| | | |
|---|---|---|
| 2O—B(2F,3F)2BB(2F,3F)—O2 | (1-6) | 4% |
| 4O—B(2F,3F)2BB(2F,3F)—O2 | (1-6) | 5% |
| 6O—B(2F,3F)2BB(2F,3F)—O2 | (1-6) | 6% |
| 3-HH—V | (2-14) | 25% |
| 3-HH—V1 | (2-15) | 9% |
| 3-HB(2F,3F)—O2 | (3-1) | 9% |
| 5-HB(2F,3F)—O2 | (3-1) | 5% |
| 5-BB(2F,3F)—O2 | (3-4) | 2% |
| 3-HHB(2F,3F)—O2 | (3-6) | 4% |
| V—HHB(2F,3F)—O2 | (3-6) | 7% |
| 3-HBB(2F,3F)—O2 | (3-10) | 3% |
| 4-HBB(2F,3F)—O2 | (3-10) | 3% |
| V—HBB(2F,3F)—O2 | (3-10) | 3% |
| 3-DhB(2F)B(2F,3F)—O1 | (3) | 3% |
| 1-BB-3 | (4-2) | 3% |
| 3-HHB-1 | (4-4) | 3% |

| | | |
|---|---|---|
| VFF2—HHB-1 | (4-4) | 3% |
| 3-HH—O1 | (—) | 3% |

NI=74.9° C.; Tc<−20° C.; η=13.7 mPa·s; Δn=0.105; Δε=−3.9.

Example 16

| | | |
|---|---|---|
| 2O—B(2F,3F)2BB(2F,3F)—O2 | (1-6) | 4% |
| 1V2—HH—2V1 | (2-10) | 5% |
| 3-HH—V | (2-14) | 30% |
| V—HB(2F,3F)—O2 | (3-1) | 5% |
| 3-H2B(2F,3F)—O2 | (3-2) | 4% |
| 2-HHB(2F,3F)—O2 | (3-6) | 5% |
| 4-HHB(2F,3F)—O2 | (3-6) | 6% |
| 2-HH1OB(2F,3F)—O2 | (3-8) | 3% |
| 3-HH1OB(2F,3F)—O2 | (3-8) | 3% |
| 2-BB(2F,3F)B-3 | (3-9) | 3% |
| 3-HBB(2F,3F)—O2 | (3-10) | 7% |
| 5-HBB(2F,3F)—O2 | (3-10) | 8% |
| V—HchB(2F,3F)—O2 | (3-19) | 4% |
| 3-dhB(F)B(2F,3F)—O2 | (3) | 4% |
| 3-HB—O2 | (4-1) | 6% |
| 5-HB—O2 | (4-1) | 3% |

NI=84.3° C.; Tc<−20° C.; η=12.5 mPa·s; Δn=0.104; Δε=−3.6.

Example 17

| | | |
|---|---|---|
| 2O—B(2F,3F)O1HB(2F,3F)—O2 | (1-7) | 5% |
| 2O—B(2F,3F)O1BB(2F,3F)—O2 | (1-8) | 5% |
| V—HH—V | (2-1) | 15% |
| 3-HH—V | (2-14) | 14% |
| 3-HB(2F,3F)—O2 | (3-1) | 12% |
| 5-HB(2F,3F)—O2 | (3-1) | 12% |
| 3-HHB(2F,3F)—O2 | (3-6) | 8% |
| 5-HHB(2F,3F)—O2 | (3-6) | 9% |
| 3-HHB-1 | (4-4) | 10% |
| 3-HHB-3 | (4-4) | 10% |

NI=79.6° C.; Tc<−20° C.; η=17.7 mPa·s; Δn=0.048; Δε=−2.9.

Example 18

| | | |
|---|---|---|
| 2O—B(2F,3F)2BB(2F,3F)—O2 | (1-6) | 3% |
| 4O—B(2F,3F)2BB(2F,3F)—O2 | (1-6) | 4% |
| V—HH—V | (2-1) | 5% |
| 1V—HH—V1 | (2-5) | 5% |
| 3-HH—V | (2-14) | 22% |
| V—RB(2F,3F)—O2 | (3-1) | 6% |
| 3-BB(2F,3F)—O2 | (3-4) | 7% |
| V2—BB(2F,3F)—O2 | (3-4) | 8% |
| 2-HHB(2F,3F)—O2 | (3-6) | 3% |
| 3-HHB(2F,3F)—O2 | (3-6) | 8% |
| V—HHB(2F,3F)—O2 | (3-6) | 10% |
| V—HHB(2F,3F)—O4 | (3-6) | 6% |
| 3-HBB(2F,3F)—O2 | (3-10) | 7% |
| 3-DhB(F)B(2F,3F)—O2 | (3) | 4% |
| V—HHB-1 | (4-4) | 2% |

NI=78.0° C.; Tc<−20° C.; η=14.6 mPa·s; Δε=−4.2; Δn=0.110.

Example 19

| Compound | Code | % |
|---|---|---|
| 2O—B(2F,3F)2HB(2F,3F)—O2 | (1-3) | 3% |
| 2O—B(2F,3F)O1BB(2F,3F)—O2 | (1-8) | 4% |
| V—HH—V1 | (2-2) | 10% |
| V—HH—2V1 | (2-4) | 5% |
| 3-HH—V | (2-14) | 18% |
| 3-H2B(2F,3F)—O2 | (3-2) | 3% |
| 3-BB(2F,3F)—O2 | (3-4) | 5% |
| 5-BB(2F,3F)—O2 | (3-4) | 4% |
| 3-HHB(2F,3F)—O2 | (3-6) | 5% |
| V—HHB(2F,3F)—O2 | (3-6) | 5% |
| 3-HH2B(2F,3F)—O2 | (3-7) | 3% |
| 5-HH2B(2F,3F)—O2 | (3-7) | 3% |
| V—HH1OB(2F,3F)—O2 | (3-8) | 3% |
| 2-HBB(2F,3F)—O2 | (3-10) | 5% |
| 3-HHB(2F,3C1)—O2 | (3-12) | 2% |
| 5-HHB(2F,3C1)—O2 | (3-12) | 3% |
| 3-HchB(2F,3F)—O2 | (3-19) | 2% |
| 3-BB(2F)B(2F,3F)—O2 | (3-20) | 4% |
| 3-BB(F)B(2F,3F)—O2 | (3-21) | 2% |
| 3-dhB(F)B(2F,3F)—O2 | (3) | 3% |
| 5-HB—O2 | (4-1) | 2% |
| V2—BB-1 | (4-2) | 2% |
| 3-HBB-2 | (4-5) | 4% |

NI=87.2° C.; Tc<−20° C.; η=13.9 mPa·s; Δn=0.117; Δε=−3.7.

Example 20

| Compound | Code | % |
|---|---|---|
| 2O—B(2F,3F)2BB(2F,3F)—O2 | (1-6) | 3% |
| 4O—B(2F,3F)2BB(2F,3F)—O2 | (1-6) | 4% |
| 2O—B(2F,3F)O1HB(2F,3F)—O2 | (1-7) | 3% |
| V—HH—V | (2-1) | 5% |
| 1V—HH—V1 | (2-5) | 5% |
| 3-HH—V | (2-14) | 14% |
| 3-HH—V1 | (2-15) | 5% |
| 3-HB(2F,3F)—O2 | (3-1) | 3% |
| 3-BB(2F,3F)—O2 | (3-4) | 3% |
| 5-BB(2F,3F)—O2 | (3-4) | 3% |
| 2-HHB(2F,3F)—O2 | (3-6) | 4% |
| 3-HHB(2F,3F)—O2 | (3-6) | 8% |
| V—HHB(2F,3F)—O2 | (3-6) | 3% |
| V—HH1OB(2F,3F)—O2 | (3-8) | 3% |
| 2-HBB(2F,3F)—O2 | (3-10) | 5% |
| 3-HBB(2F,3F)—O2 | (3-10) | 8% |
| 3-DhB(F)B(2F,3F)—O2 | (3) | 3% |
| 1-BB-3 | (4-2) | 3% |
| 1-BB-5 | (4-2) | 3% |
| 3-HHB-1 | (4-4) | 3% |
| 3-HHEBH-3 | (4-10) | 4% |
| 2-HH-3 | (—) | 5% |

NI=90.9° C.; Tc<−20° C.; η=14.1 mPa·s; Δn=0.113; Δε=−3.7.

Example 21

| Compound | Code | % |
|---|---|---|
| 2O—B(2F,3F)2BB(2F,3F)—O2 | (1-6) | 3% |
| 6O—B(2F,3F)2BB(2F,3F)—O2 | (1-6) | 4% |
| V—HH—V | (2-1) | 10% |
| 3-HH—V | (2-14) | 15% |
| 3-HH—V1 | (2-15) | 3% |
| 5-HH—V | (2) | 3% |
| 5-HB(2F,3F)—O2 | (3-1) | 4% |
| 3-H1OB(2F,3F)—O2 | (3-3) | 3% |
| 3-BB(2F,3F)—O2 | (3-4) | 8% |
| 2O—BB(2F,3F)—O2 | (3-4) | 5% |
| 4-HHB(2F,3F)—O2 | (3-6) | 4% |
| V—HHB(2F,3F)—O2 | (3-6) | 10% |
| 3-HBB(2F,3F)—O2 | (3-10) | 5% |
| 4-HBB(2F,3F)—O2 | (3-10) | 5% |
| 3-DhB(F)B(2F,3F)—O4 | (3) | 3% |
| 1V2—BB-1 | (4-2) | 3% |
| 3-HHEBH-4 | (4-10) | 3% |
| 5-HBB(F)B-3 | (4-12) | 3% |
| 2-HH-5 | (—) | 3% |
| 3-HH-4 | (—) | 3% |

NI=83.8° C.; Tc<−20° C.; η=12.4 mPa·s; Δn=0.113; Δε=−3.7.

Example 22

| Compound | Code | % |
|---|---|---|
| 2O—B(2F,3F)2HB(2F,3F)—O2 | (1-3) | 3% |
| 2O—B(2F,3F)2BB(2F,3F)—O2 | (1-6) | 3% |
| 4O—B(2F,3F)2BB(2F,3F)—O2 | (1-6) | 3% |
| 2O—B(2F,3F)O1BB(2F,3F)—O2 | (1-8) | 2% |
| V—HH—V | (2-1) | 10% |
| V—HH—2V1 | (2-4) | 3% |
| 1V2—HH—2V1 | (2-10) | 5% |
| 3-HH—V | (2-14) | 10% |
| 5-HB(2F,3F)—O2 | (3-1) | 2% |
| 3-BB(2F,3F)—O2 | (3-4) | 5% |
| 2-HHB(2F,3F)—O2 | (3-6) | 4% |
| V—HHB(2F,3F)—O2 | (3-6) | 4% |
| V—HHB(2F,3F)—O4 | (3-6) | 5% |
| 3-HBB(2F,3F)—O2 | (3-10) | 10% |
| 5-HBB(2F,3F)—O2 | (3-10) | 5% |
| 3-DhB(2F)B(2F,3F)—O2 | (3) | 3% |
| 7-HB-1 | (4-1) | 3% |
| 1-BB-3 | (4-2) | 3% |
| 3-HHEH-5 | (4-3) | 3% |
| 3-HHB-3 | (4-4) | 3% |
| V2—HHB-1 | (4-4) | 3% |
| 2-BB(F)B-3 | (4-6) | 3% |
| 2-HH-3 | (—) | 5% |

NI=89.0° C.; Tc<−20° C.; η=13.0 mPa·s; Δn=0.116; Δε=−3.4.

Example 23

| Compound | Code | % |
|---|---|---|
| 2O—B(2F,3F)2BB(2F,3F)—O2 | (1-6) | 4% |
| V—HH—V1 | (2-2) | 3% |
| 1V2—HH—2V1 | (2-10) | 10% |
| VFF—HH—VFF | (2-13) | 2% |
| 3-HH—V | (2-14) | 20% |
| V—HB(2F,3F)—O2 | (3-1) | 5% |
| 3-H2B(2F,3F)—O2 | (3-2) | 4% |
| 2-HHB(2F,3F)—O2 | (3-6) | 5% |
| 4-HHB(2F,3F)—O2 | (3-6) | 6% |
| 2-HH1OB(2F,3F)—O2 | (3-8) | 3% |
| 3-HH1OB(2F,3F)—O2 | (3-8) | 3% |
| 2-BB(2F,3F)B-3 | (3-9) | 3% |
| 3-HBB(2F,3F)—O2 | (3-10) | 7% |
| 5-HBB(2F,3F)—O2 | (3-10) | 8% |
| V2—HchB(2F,3F)—O2 | (3-19) | 4% |
| 3-dhB(F)B(2F,3F)—O2 | (3) | 4% |
| 3-HB—O2 | (4-1) | 6% |
| 5-HB—O2 | (4-1) | 3% |

NI=88.7° C.; η=12.9 mPa·s; Δn=0.109; Δε=−3.7.

The viscosity of the composition in Comparative Example 1 was 25.4 mPa·s. On the other hand, the viscosity of the compositions in Examples 1 to 23 were from 12.1 mPa·s to 19.1 mPa·s. Thus, the composition in Examples each has lower viscosity in comparison with the composition in Comparative Examples. Accordingly, the liquid crystal composition of the invention is concluded to have superb characteristics.

INDUSTRIAL APPLICABILITY

A liquid crystal composition of the invention can be used in a liquid crystal monitor, a liquid crystal television and so forth.

What is claimed is:

1. A liquid crystal composition that has negative dielectric anisotropy, and contains at least one compound selected from compounds represented by formula (1) and at least one compound selected from compounds represented by formula (2):

(1)

(2)

wherein, in formula (1) and formula (2), $R^1$ and $R^2$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine; $R^3$ is alkyl having 1 to 12 carbons, alkenyl having 2 to 12 carbons, or alkenyl having 2 to 12 carbons in which at least one hydrogen is replaced by fluorine or chlorine; $R^4$ is alkenyl having 2 to 12 carbons, or alkenyl having 2 to 12 carbons in which at least one hydrogen is replaced by fluorine or chlorine; ring A is 1,4-cyclohexylene, 1,4-phenylene, 2-fluoro-1,4-phenylene, 2,3-difluoro-1,4-phenylene, tetrahydropyran-2,5-diyl, pyrimidine-2,5-diyl or pyridine-2,5-diyl; $L^1$, $L^2$, $L^3$ and $L^4$ are independently hydrogen or fluorine, in which at least three thereof is fluorine; and $Z^1$ is a single bond, ethylene, carbonyloxy or methyleneoxy.

2. The liquid crystal composition according to claim 1, containing at least one compound selected from the group of compounds represented by formula (1-1) to formula (1-8) as the at least one compound selected from compounds represented by formula (1):

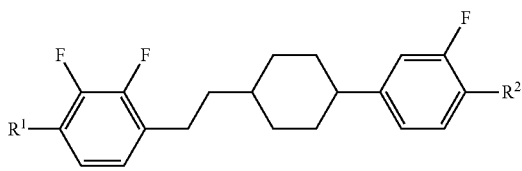
(1-1)

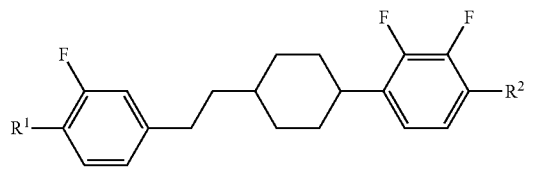
(1-2)

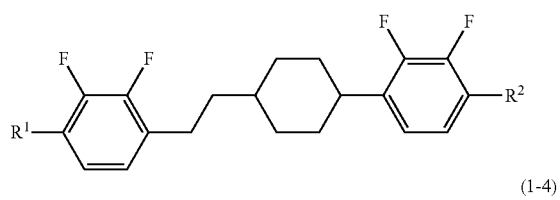
(1-3)

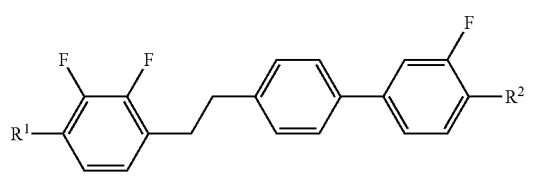
(1-4)

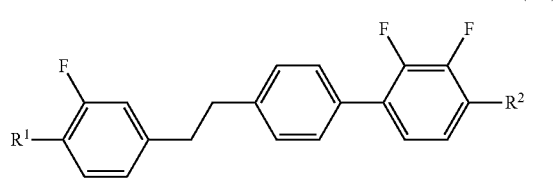
(1-5)

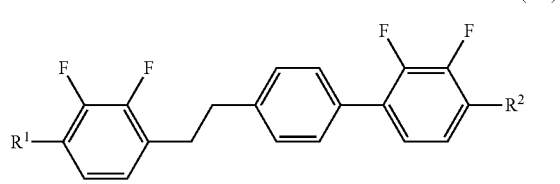
(1-6)

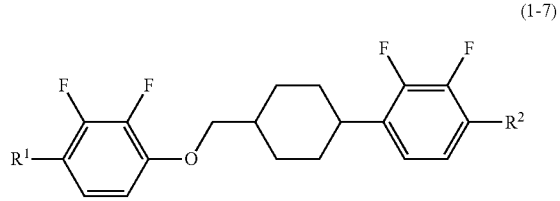
(1-7)

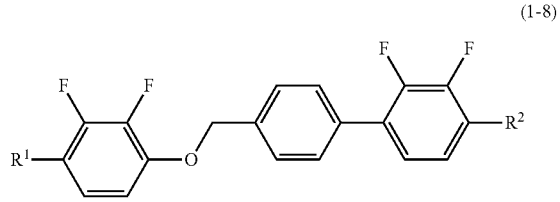
(1-8)

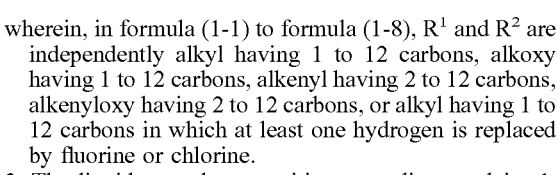

wherein, in formula (1-1) to formula (1-8), $R^1$ and $R^2$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine.

3. The liquid crystal composition according to claim 1, containing at least one compound selected from the group of compounds represented by formula (2-1) to formula (2-18) as the at least one compound selected from compounds represented by formula (2):

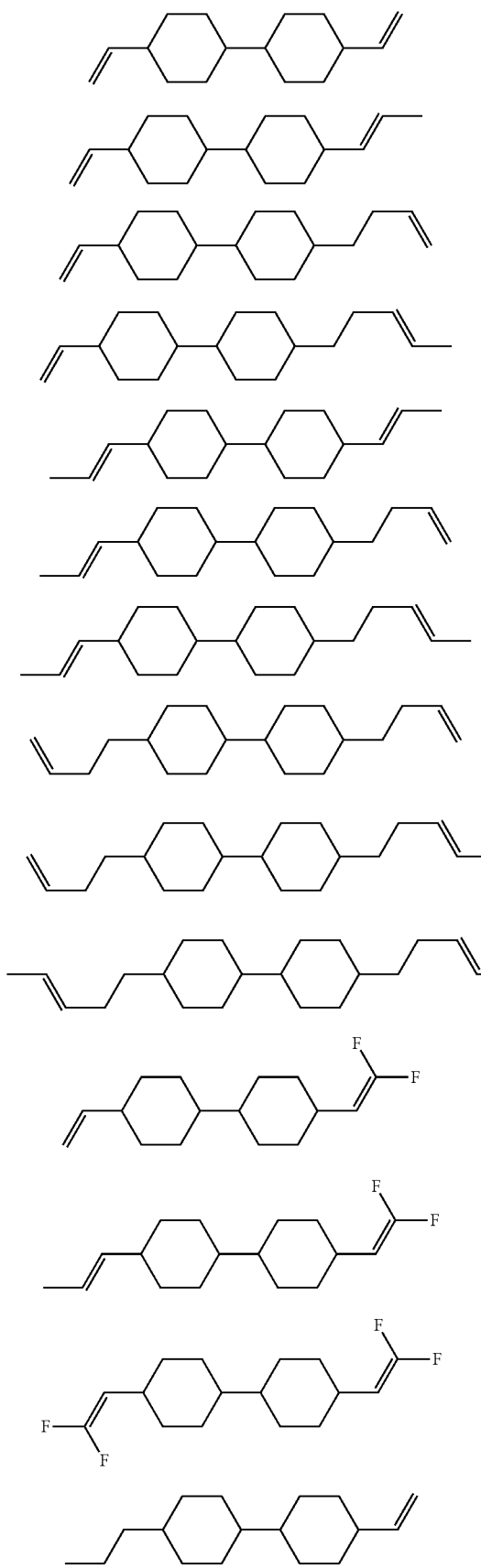
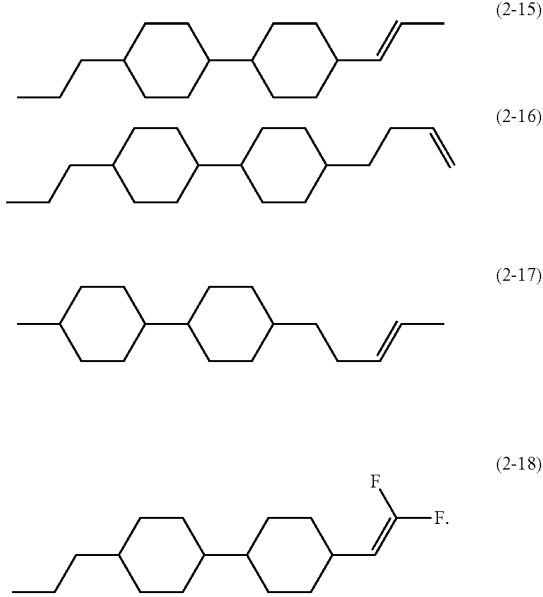

4. The liquid crystal composition according to claim 1, wherein a proportion of the at least one compound selected from compounds represented by formula (1) is in the range from 3% by weight to 25% by weight, and a proportion of the at least one compound selected from compounds represented by formula (2) is in the range from 15% by weight to 70% by weight.

5. The liquid crystal composition according to claim 1, containing at least one compound selected from compounds represented by formula (3):

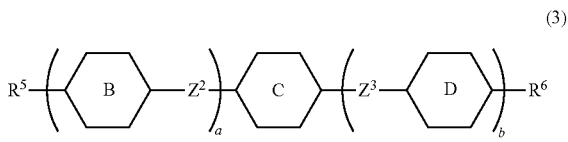

wherein, in formula (3), $R^5$ and $R^6$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine; ring B and ring D are independently 1,4-cyclohexylene, 1,4-cyclohexenylene, 1,4-phenylene, tetrahydropyran-2,5-diyl, 1,4-phenylene in which at least one hydrogen is replaced by fluorine or chlorine, naphthalene-2,6-diyl, naphthalene-2,6-diyl in which at least one hydrogen is replaced by fluorine or chlorine, chroman-2,6-diyl, or chroman-2,6-diyl in which at least one hydrogen is replaced by fluorine or chlorine; ring C is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^2$ and $Z^3$ are independently a single bond, ethylene, carbonyloxy or methyleneoxy; and a is 1, 2 or 3, b is 0 or 1, and a sum of a and b is 3 or less; however, compounds represented by formula (1) are excluded from compounds represented by formula (3):

(1)

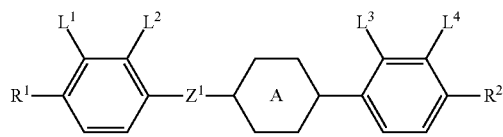

wherein, in formula (1), $R^1$ and $R^2$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine; ring A is 1,4-cyclohexylene, 1,4-phenylene, 2-fluoro-1,4-phenylene, 2,3-difluoro-1,4-phenylene, tetrahydropyran-2,5-diyl, pyrimidine-2,5-diyl or pyridine-2,5-diyl; $L^1$, $L^2$, $L^3$ and $L^4$ are independently hydrogen or fluorine, in which at least three thereof is fluorine; and $Z^1$ is a single bond, ethylene, carbonyloxy or methyleneoxy.

6. The liquid crystal composition according to claim 5, containing at least one compound selected from the group of compounds represented by formula (3-1) to formula (3-22) as the at least one compound selected from compounds represented by formula (3):

(3-1)
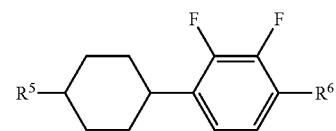

(3-2)
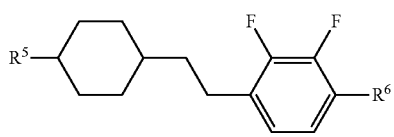

(3-3)
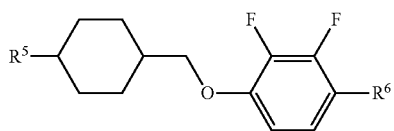

(3-4)
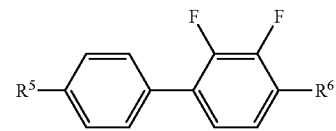

(3-5)
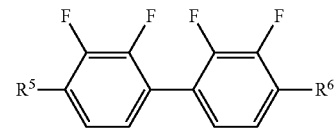

(3-6)
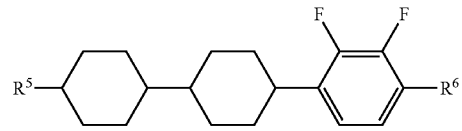

(3-7)
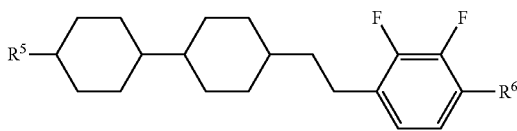

(3-8)
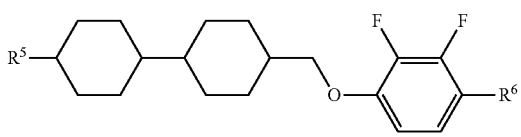

(3-9)
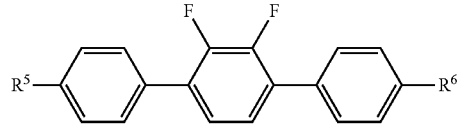

(3-10)
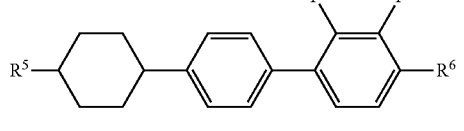

(3-11)
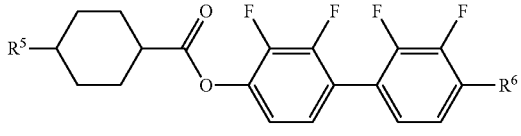

(3-12)
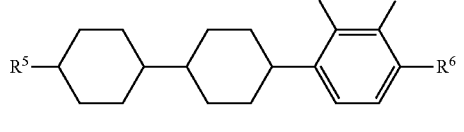

(3-13)
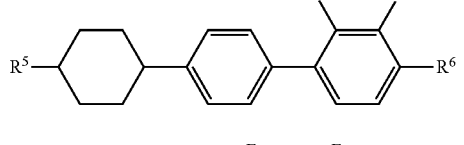

(3-14)
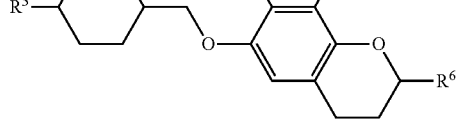

(3-15)
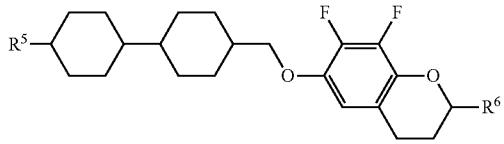

(3-16)
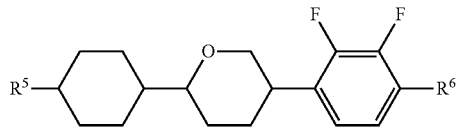

-continued (3-17)
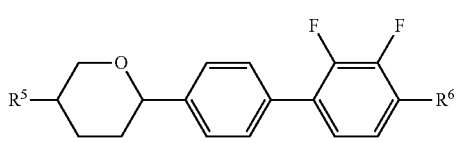

(3-18)
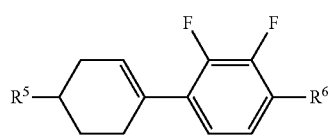

(3-19)
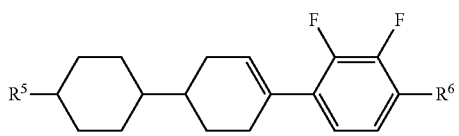

(3-20)
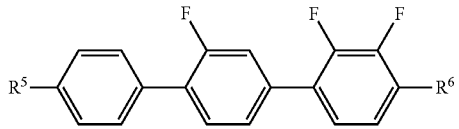

(3-21)
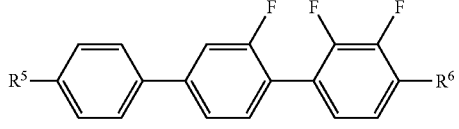

(3-22)
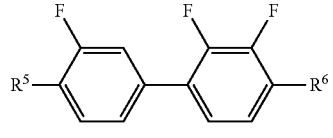

wherein, in formula (3-1) to formula (3-22), $R^5$ and $R^6$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine.

7. The liquid crystal composition according to claim 5, wherein a proportion of the at least one compound selected from compounds represented by formula (3) is in the range from 20% by weight to 75% by weight.

8. The liquid crystal composition according to claim 1, containing at least one compound selected from compounds represented by formula (4):

(4)
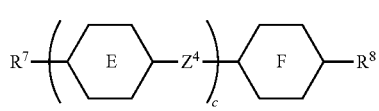

wherein, in formula (4), $R^7$ and $R^8$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; ring E and ring F are independently 1,4-cyclohexylene, 1,4-phenylene, 2-fluoro-1,4-phenylene or 2,5-difluoro-1,4-phenylene; $Z^4$ is a single bond, ethylene or carbonyloxy; c is 1, 2 or 3; and ring F is 1,4-phenylene when c is 1.

9. The liquid crystal composition according to claim 8, containing at least one compound selected from the group of compounds represented by formula (4-1) to formula (4-12) as the at least one compound selected from compounds represented by formula (4):

(4-1)
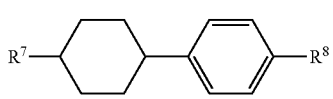

(4-2)
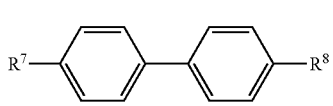

(4-3)

(4-4)
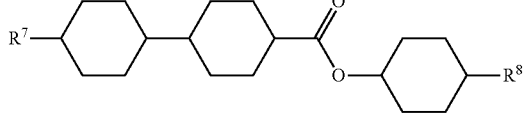

(4-5)
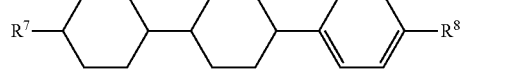

(4-6)
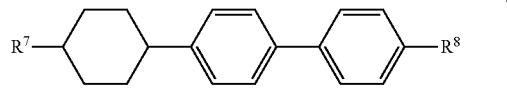

(4-7)
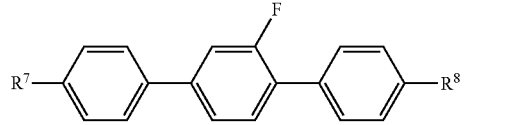

(4-8)
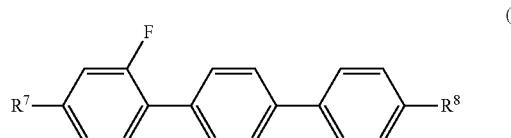

(4-9)
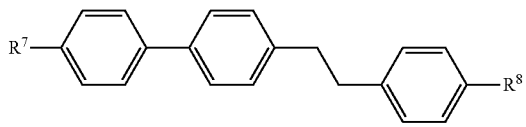

(4-10)
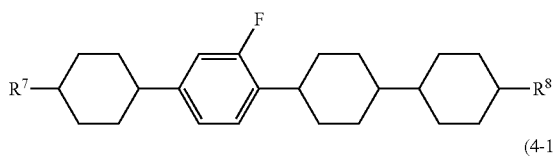

(4-11)
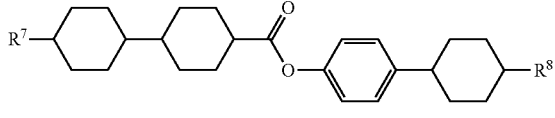

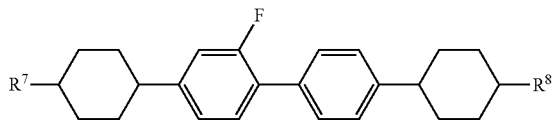

-continued (4-12)

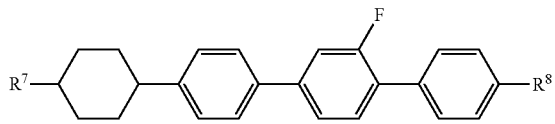

wherein, in formula (4-1) to formula (4-12), $R^7$ and $R^8$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine.

10. The liquid crystal composition according to claim 8, wherein a proportion of the at least one compound selected from compounds represented by formula (4) is in the range from 2% by weight to 30% by weight.

11. The liquid crystal composition according to claim 5, containing at least one compound selected from compounds represented by formula (4):

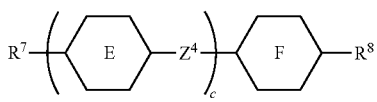

(4)

wherein, in formula (4), $R^7$ and $R^8$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; ring E and ring F are independently 1,4-cyclohexylene, 1,4-phenylene, 2-fluoro-1,4-phenylene or 2,5-difluoro-1,4-phenylene; $Z^4$ is a single bond, ethylene or carbonyloxy; c is 1, 2 or 3; and ring F is 1,4-phenylene when c is 1.

12. The liquid crystal composition according to claim 1, containing at least one compound selected from polymerizable compounds represented by formula (5) as an additive:

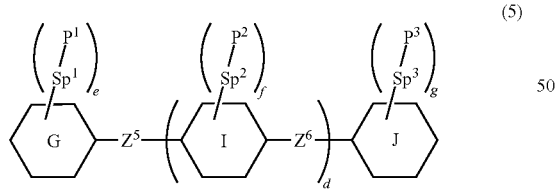

(5)

wherein, in formula (5), ring G and ring J are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; ring I is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^5$ and $Z^6$ are independently a single bond or an alkylene having 1 to 10 carbons, and in the alkylene, at least one piece of —$CH_2$— may be replaced by —O—, —CO—, —COO— or —OCO—, and at least one piece of —$CH_2$—$CH_2$— may be replaced by —CH=CH—, —C($CH_3$)=CH—, —CH=C($CH_3$)— or —C($CH_3$)=C($CH_3$)—, and in these groups, at least one hydrogen may be replaced by fluorine or chlorine; $P^1$, $P^2$ and $P^3$ are independently a polymerizable group; $Sp^1$, $Sp^2$ and $Sp^3$ are independently a single bond or alkylene having 1 to 10 carbons, and in the alkylene, at least one piece of —$CH_2$— may be replaced by —O—, —COO—, —OCO— or —OCOO—, and at least one piece of —$CH_2$—$CH_2$— may be replaced by —CH=CH— or and in these groups, at least one hydrogen may be replaced by fluorine or chlorine; d is 0, 1 or 2; and e, f and g are independently 0, 1, 2, 3 or 4, and a sum of e, f and g is 1 or more.

13. The liquid crystal composition according to claim 12, wherein, in formula (5), $P^1$, $P^2$ and $P^3$ are independently a group selected from the group of polymerizable groups represented by formula (P-1) to formula (P-5):

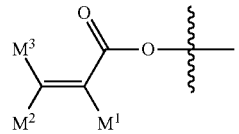

(P-1)

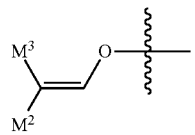

(P-2)

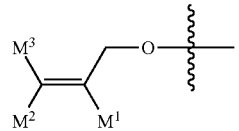

(P-3)

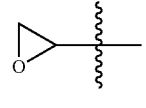

(P-4)

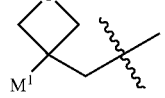

(P-5)

wherein, in formula (P-1) to formula (P-5), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine.

14. The liquid crystal composition according to claim 12, containing at least one compound selected from the group of polymerizable compounds represented by formula (5-1) to formula (5-27) as the additive:
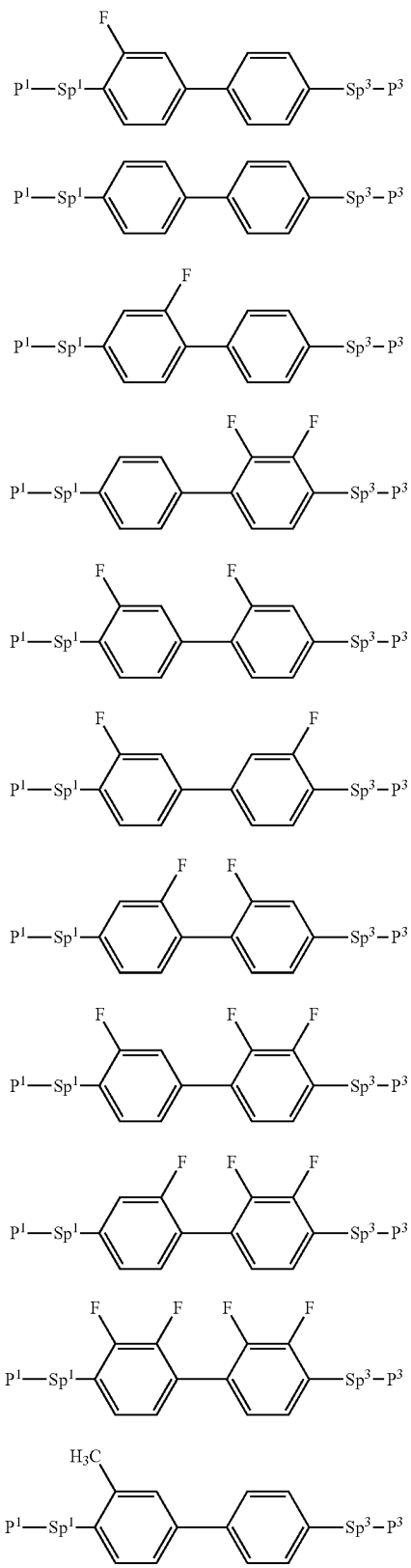
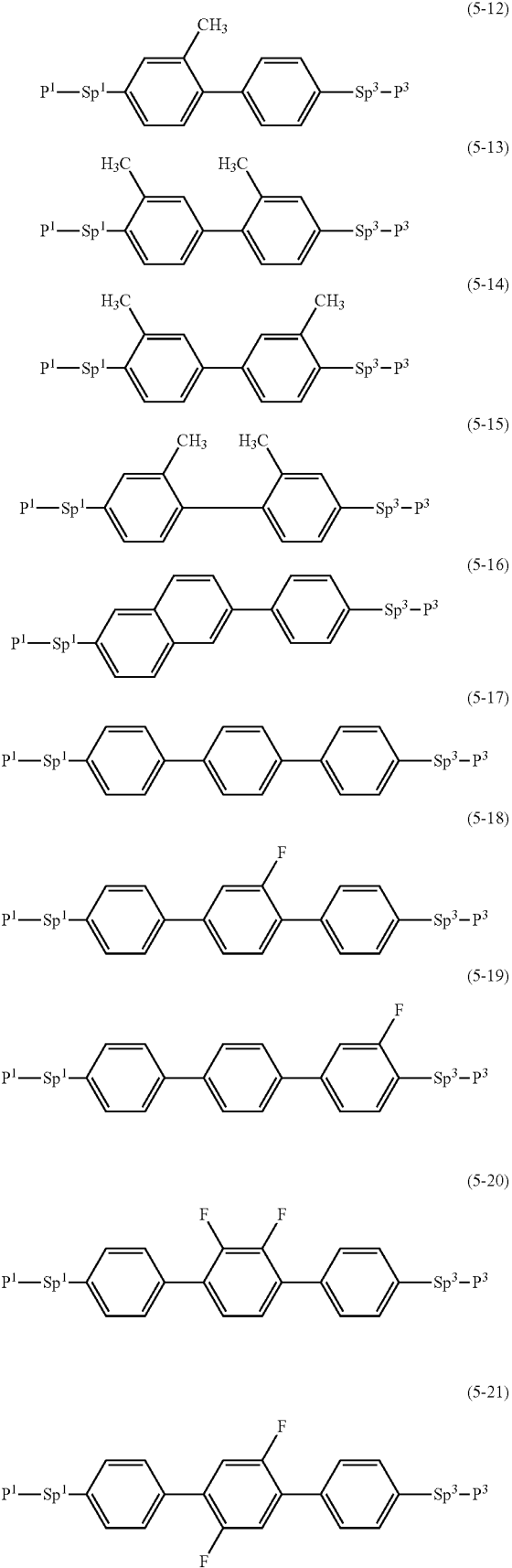

(5-22)
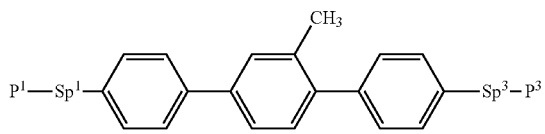

(5-23)
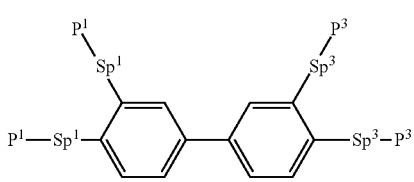

(5-24)
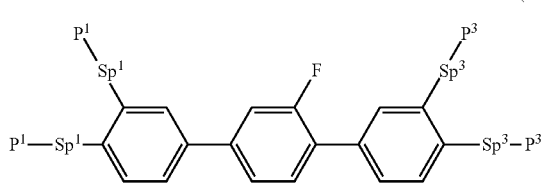

(5-25)
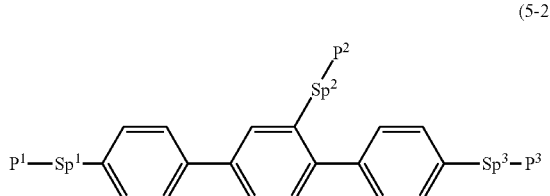

(5-26)
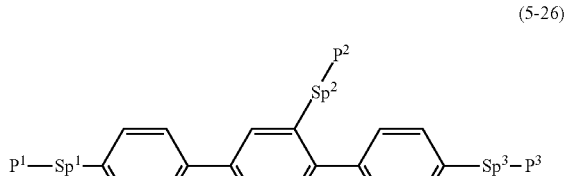

(5-27)
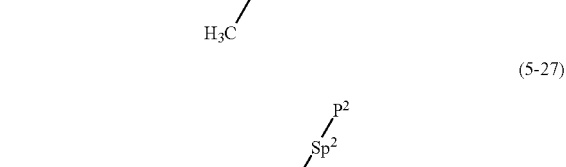

wherein, in formula (5-1) to formula (5-27), P¹, P² and P³ are independently a group selected from the group of polymerizable groups represented by formula (P-1) to formula (P-3):

(P-1)
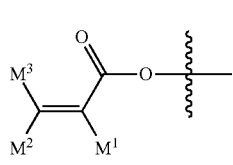

(P-2)
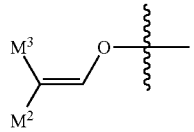

(P-3)
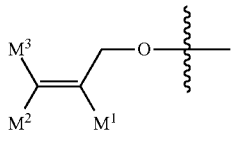

wherein $M^1$, $M^2$ and $M^3$ are independently hydrogen, fluorine, alkyl having 1 to 5 carbons, or alkyl having 1 to 5 carbons in which at least one hydrogen is replaced by fluorine or chlorine; and $Sp^1$, $Sp^2$ and $Sp^3$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$—CH$_2$— may be replaced by —CH=CH— or —C≡C—, and in these groups, at least one hydrogen may be replaced by fluorine or chlorine.

15. The liquid crystal composition according to claim 12, wherein a proportion of the additive is in the range from 0.03% by weight to 10% by weight.

16. The liquid crystal composition according to claim 5, containing at least one compound selected from polymerizable compounds represented by formula (5) as an additive:

(5)
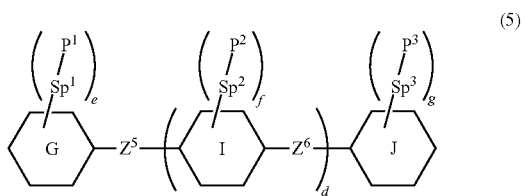

wherein, in formula (5), ring G and ring J are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; ring I is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^5$ and $Z^6$ are independently a single bond or alkylene having 1 to 10 carbons, and in the alkylene, at least one piece of —CH$_2$— may be replaced by —O—, —CO—, —COO— or —OCO—, and at least one piece of —CH$_2$—CH$_2$— may be replaced by —CH=CH—, —C(CH$_3$)=CH—, —CH=C(CH$_3$)— or —C(CH$_3$)=C(CH$_3$)—, and in these groups, at least one hydrogen may be replaced by fluorine or chlorine; P$^1$, P$^2$ and P$^3$ are independently a polymerizable group; Sp$^1$, Sp$^2$ and Sp$^3$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$—CH$_2$— may be replaced by —CH=CH— or —C≡C—, and in these groups, at least one hydrogen may be replaced by fluorine or chlorine; d is 0, 1 or 2; and e, f and g are independently 0, 1, 2, 3 or 4, and a sum of e, f and g is 1 or more.

17. The liquid crystal composition according to claim 11, containing at least one compound selected from polymerizable compounds represented by formula (5) as an additive:

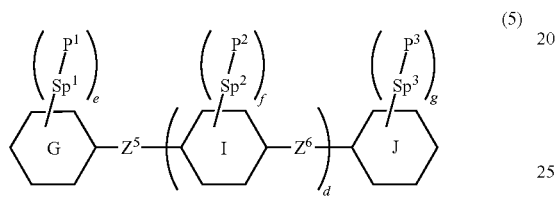

(5)

wherein, in formula (5), ring G and ring J are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; ring I is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; Z$^5$ and Z$^6$ are independently a single bond or alkylene having 1 to 10 carbons, and in the alkylene, at least one piece of —CH$_2$— may be replaced by —O—, —CO—, —COO— or —OCO—, and at least one piece of —CH$_2$—CH$_2$— may be replaced by —CH=CH—, —C(CH$_3$)=CH—, —CH=C(CH$_3$)— or —C(CH$_3$)=C(CH$_3$)—, and in these groups, at least one hydrogen may be replaced by fluorine or chlorine; P', and P$^2$ and P$^3$ are independently a polymerizable group; Sp$^1$, Sp$^2$ and Sp$^3$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$—CH$_2$— may be replaced by —CH=CH— or —C≡C—, and in these groups, at least one hydrogen may be replaced by fluorine or chlorine; d is 0, 1 or 2; and e, f and g are independently 0, 1, 2, 3 or 4, and a sum of e, f and g is 1 or more.

18. A liquid crystal display device, including the liquid crystal composition according to claim 1.

19. The liquid crystal display device according to claim 18, wherein an operating mode in the liquid crystal display device is an IPS mode, a VA mode, an FFS mode or an FPA mode, and a driving mode in the liquid crystal display device is an active matrix mode.

20. A polymer sustained alignment mode liquid crystal display device, wherein the liquid crystal display device includes the liquid crystal composition according to claim 12, and an additive contained in the liquid crystal composition is polymerized.

* * * * *